United States Patent
Arai

(10) Patent No.: US 8,433,489 B2
(45) Date of Patent: Apr. 30, 2013

(54) TRANSMISSION CONTROL SYSTEM WITH ADJUSTABLE CLUTCH DISCONNECTION AND VEHICLE INCLUDING SAME

(75) Inventor: Katsuhiro Arai, Shizuoka (JP)

(73) Assignee: Yamaha Hatsusoki Kabushiki Kaisha, Shizuoka (JP)

( * ) Notice: Subject to any disclaimer, the term of this patent is extended or adjusted under 35 U.S.C. 154(b) by 888 days.

(21) Appl. No.: 12/566,177

(22) Filed: Sep. 24, 2009

(65) Prior Publication Data

US 2010/0087995 A1  Apr. 8, 2010

(30) Foreign Application Priority Data

Oct. 6, 2008  (JP) .................................. 2008-259261

(51) Int. Cl.
*G06F 7/00* (2006.01)
(52) U.S. Cl.
USPC ............................................ 701/68; 477/175
(58) Field of Classification Search ................ 701/52, 701/66, 67, 68; 477/70, 80, 87, 174, 175
See application file for complete search history.

(56) References Cited

U.S. PATENT DOCUMENTS

| | | | | | |
|---|---|---|---|---|---|
| 4,530,256 | A | * | 7/1985 | Hattori ............................. | 474/28 |
| 5,782,710 | A | * | 7/1998 | Kosik et al. ...................... | 477/86 |
| 6,319,167 | B1 | * | 11/2001 | Yoshida et al. .................... | 477/5 |
| 6,561,050 | B2 | * | 5/2003 | Yamamoto ....................... | 74/335 |
| 6,647,817 | B2 | * | 11/2003 | Kobayashi ...................... | 74/359 |
| 7,013,746 | B2 | * | 3/2006 | Matsumura et al. ............. | 74/335 |
| 7,014,026 | B2 | * | 3/2006 | Drussel et al. ............. | 192/105 B |
| 7,079,933 | B2 | * | 7/2006 | Kano et al. ....................... | 701/67 |
| 7,354,378 | B2 | * | 4/2008 | Ochi et al. ..................... | 477/115 |
| 7,416,515 | B2 | * | 8/2008 | Iriyama et al. ................. | 477/107 |
| 7,468,018 | B2 | * | 12/2008 | Radich ............................. | 477/78 |
| 7,632,211 | B2 | * | 12/2009 | Groner et al. ................... | 477/71 |
| 7,678,020 | B2 | * | 3/2010 | Matsumura et al. ........... | 477/174 |
| 8,150,587 | B2 | * | 4/2012 | Tomoda et al. ................. | 701/64 |
| 8,182,398 | B2 | * | 5/2012 | Fukushiro et al. ............. | 477/133 |
| 2002/0007241 | A1 | * | 1/2002 | Kupper et al. ................... | 701/51 |
| 2002/0193203 | A1 | * | 12/2002 | Lohr et al. ....................... | 477/74 |
| 2004/0073348 | A1 | * | 4/2004 | Stragapede ...................... | 701/51 |
| 2005/0126322 | A1 | * | 6/2005 | Kozaki et al. .................... | 74/335 |
| 2005/0137056 | A1 | * | 6/2005 | Yamada et al. ................ | 477/156 |

(Continued)

FOREIGN PATENT DOCUMENTS

| | | |
|---|---|---|
| EP | 1 150 044 A2 | 10/2001 |
| EP | 1 826 445 A2 | 8/2007 |

(Continued)

OTHER PUBLICATIONS

Official Communication issued in corresponding European Patent Application No. 09012528.7, mailed on Oct. 31, 2011.

*Primary Examiner* — Thomas Black
*Assistant Examiner* — Sze-Hon Kong
(74) *Attorney, Agent, or Firm* — Keating & Bennett, LLP

(57) ABSTRACT

A transmission control system includes an up-shifting operation device, a clutch actuator, a shift actuator and a CPU. The CPU controls the clutch actuator to start a disconnection operation of a clutch at a time point when movement of an operation lever of the up-shifting operation device is started. Moreover, the CPU controls the clutch actuator to complete the disconnection operation of the clutch at a time point when the movement of the operation lever is finished. Then, the CPU shifts a gear position of a transmission by controlling the shift actuator.

9 Claims, 19 Drawing Sheets

U.S. PATENT DOCUMENTS

| | | | |
|---|---|---|---|
| 2006/0124422 A1* | 6/2006 | Zenno | 192/3.61 |
| 2006/0128525 A1* | 6/2006 | Zenno | 477/115 |
| 2006/0128527 A1* | 6/2006 | Zenno et al. | 477/170 |
| 2006/0160660 A1* | 7/2006 | Zenno et al. | 477/114 |
| 2007/0243972 A1 | 10/2007 | Minami | |
| 2008/0220936 A1* | 9/2008 | Kobayashi et al. | 477/70 |
| 2008/0221760 A1* | 9/2008 | Wakamatsu et al. | 701/52 |
| 2008/0293539 A1* | 11/2008 | Matsubara et al. | 477/37 |

FOREIGN PATENT DOCUMENTS

| | | |
|---|---|---|
| EP | 2 023 016 A1 | 2/2009 |
| JP | 60-85297 U | 6/1985 |
| JP | 07-127666 A | 5/1995 |
| JP | 09-053712 A | 2/1997 |
| JP | 09-196161 A | 7/1997 |
| JP | 10-184885 A | 7/1998 |
| JP | 11-002259 A | 1/1999 |
| JP | 11-006560 A | 1/1999 |
| JP | 2001-221335 A | 8/2001 |
| JP | 2004-092702 A | 3/2004 |
| JP | 2006-022912 A | 1/2006 |
| JP | 2007-092877 A | 4/2007 |
| JP | 2007-223479 A | 9/2007 |
| JP | 2007-285451 A | 11/2007 |

* cited by examiner

TRANSMISSION CONTROL SYSTEM WITH ADJUSTABLE CLUTCH DISCONNECTION AND VEHICLE INCLUDING SAME

BACKGROUND OF THE INVENTION

1. Field of the Invention

The present invention relates to a transmission control system of a vehicle and a vehicle including the same.

2. Description of the Related Art

Conventionally, there have been developed automatic or semi-automatic transmission control systems capable of automatically changing a gear ratio of a transmission. In such a transmission control system, the gear ratio is generally changed at a preset suitable speed. This prevents an occurrence of a shift shock in a vehicle.

In the vehicle in which the gear ratio is changed at the preset speed, the gear ratio of the transmission cannot be quickly changed even though a driver desires a quick speed change.

Therefore, a transmission control device of a stepless transmission described in JP 9-53712 A, for example, is provided with an automatic speed change mode and a manual speed change mode. The rate of change of the gear ratio in the manual speed change mode is set faster than that in the automatic speed change mode. Thus, the driver operates a speed change lever in the manual speed change mode to enable a quick speed change operation of the transmission in the vehicle including the transmission control device.

In the foregoing transmission control device, however, the driver operates the speed change lever in the manual speed change mode to always cause the gear ratio to be quickly changed. In other words, the speed change operation is quickly performed even when the driver does not desire the quick speed change operation. This leads to degradation of drivability of the vehicle.

SUMMARY OF THE INVENTION

In order to overcome the problems described above, preferred embodiments of the present invention provide a transmission control system capable of improving drivability and a vehicle including the same.

According to a preferred embodiment of the present invention, a transmission control system of a vehicle including an engine, a clutch and a transmission, includes a shifting operation member arranged to be operated by a driver to shift a gear position of the transmission, a clutch actuation mechanism arranged to disconnect and connect the clutch, a shift mechanism arranged to shift the gear position of the transmission, and a controller arranged to control the clutch actuation mechanism and the shift mechanism, wherein the shifting operation member is movably provided between a first position and a second position, and the controller starts a disconnection operation of the clutch by the clutch actuation mechanism at a first time point when the shifting operation member starts to move from the first position toward the second position, completes the disconnection operation of the clutch by the clutch actuation mechanism at a second time point when the shifting operation member reaches the second position, and shifts the gear position by the shift mechanism after the second time point.

According to the transmission control system, in the case of gear-shifting of the transmission, the disconnection operation of the clutch is started at the first time point when the movement of the shifting operation device from the first position is started. The disconnection operation of the clutch is completed at the second time point when the shifting operation device reaches the second position. Then, the gear position of the transmission is shifted after the second time point.

In this manner, the disconnection operation of the clutch is started and then completed in a period during which the shifting operation device moves from the first position to the second position in the transmission control system. Accordingly, a driver can adjust the disconnection operation period of the clutch by adjusting an operation speed of the shifting operation device (a movement time of the shifting operation device from the first position to the second position). This allows the time required for the gear-shifting of the transmission to be adjusted according to the driver's intention. This results in improved drivability of the vehicle.

The controller may preferably control the disconnection operation of the clutch by the clutch actuation mechanism such that an absolute value of a transmission torque of the clutch decreases with increasing distance of the shifting operation member from the first position.

In this case, the driver can easily adjust a rate of progress of the disconnection operation of the clutch by adjusting the operation speed of the shifting operation device. This significantly improves the drivability of the vehicle.

The controller may preferably control the disconnection operation of the clutch by the clutch actuation mechanism such that an absolute value of a transmission torque of the clutch decreases according to a first target transmission torque value that is set as a value that changes corresponding to an arbitrary position between the first position and the second position.

In this case, the driver can easily adjust the rate of progress of the disconnection operation of the clutch by adjusting the operation speed of the shifting operation device. In addition, the absolute value of the transmission torque of the clutch can be decreased corresponding to the first target transmission torque value that is set as the value that changes corresponding to the arbitrary position between the first position and the second position, so that the clutch can be smoothly disconnected. This allows for smooth gear-shifting of the transmission.

The controller may preferably start a connection operation of the clutch by the clutch actuation mechanism at a third time point when the shifting operation member starts to move from the second position toward the first position, and complete the connection operation of the clutch by the clutch actuation mechanism at a fourth time point when the shifting operation member returns to the first position.

In this case, the connection operation of the clutch is started and then completed in a period during which the shifting operation device moves from the second position to the first position. Accordingly, the driver can adjust the connection operation period of the clutch by adjusting the operation speed of the shifting operation device (a movement time of the shifting operation device from the second position to the first position). This allows the time required for the gear-shifting of the transmission to be easily adjusted according to the driver's intention. This results in further improved drivability of the vehicle.

The controller may preferably control the connection operation of the clutch by the clutch actuation mechanism such that an absolute value of a transmission torque of the clutch increases with increasing distance of the shifting operation member from the second position.

In this case, the driver can easily adjust a rate of progress of the connection operation of the clutch by adjusting the operation speed of the shifting operation device. This sufficiently improves the drivability of the vehicle.

The controller may preferably control the connection operation of the clutch by the clutch actuation mechanism such that an absolute value of a transmission torque of the clutch increases according to a second target transmission torque value that is set as a value that changes corresponding to an arbitrary position between the second position and the first position.

In this case, the driver can easily adjust the rate of progress of the connection operation of the clutch by adjusting the operation speed of the shifting operation device. In addition, the absolute value of the transmission torque of the clutch can be decreased corresponding to the second target transmission torque value that is set as the value that changes corresponding to the arbitrary position between the second position and the first position, so that the clutch can be smoothly connected. This allows for smooth gear-shifting of the transmission.

The transmission control system preferably may further include an engine torque adjuster arranged to adjust an engine torque generated in the engine, wherein the controller is arranged to change the engine torque from a first value to a second value by the engine torque adjuster according to a first target engine torque value that changes corresponding to an arbitrary position between the first position and the second position in a period between the first time point and the second time point, and the controller is arranged to change the engine torque from the second value to the first value by the engine torque adjuster according to a second target engine torque value that changes corresponding to an arbitrary position between the second position and the first position in a period between the third time point and the fourth time point.

According to the transmission control system, the engine torque can be changed from the first value to the second value corresponding to the first engine torque target value in the period during which the shifting operation device moves from the first position to the second position. In addition, the engine torque can return to the first value corresponding to the second engine torque target value in the period during which the shifting operation device moves from the second position to the first position.

In this manner, the engine torque can be adjusted to a suitable value concurrently with the disconnection operation of the clutch in the transmission control system. This allows the gear-shifting of the transmission to be further smoothly performed.

The transmission control system preferably may further include a first detector arranged to detect a position of the shifting operation member between the first position and the second position, wherein the controller is arranged to control the clutch actuation mechanism based on the position detected by the first detector.

According to the transmission control system, the clutch actuation mechanism can be controlled based on the position of the shifting operation device detected by the first detector, so that the driver's intention can be sufficiently reflected in the clutch operation. This further improves the drivability of the vehicle.

The transmission control system preferably may further include a second detector arranged to detect third and fourth positions of the shifting operation member between the first position and the second position, and a measurement device arranged to measure a fifth time point when the third position is detected by the second detector and a sixth time point when the fourth position is detected by the second detector, wherein the controller is arranged to calculate a position of the shifting operation member based on the third and fourth positions detected by the second detector and the fifth and sixth time points detected by the measurement device, and control the clutch actuation mechanism based on the calculated position.

According to the transmission control system, the clutch actuation mechanism can be controlled based on the position of the shifting operation device calculated from a result of detection performed by the second detector and the measurement device, so that the driver's intention can be sufficiently reflected in the clutch operation. This further improves the drivability of the vehicle.

In the transmission control system, the second detector may preferably detect the shifting operation device at the third and fourth positions. Accordingly, inexpensive detectors can be used as the second detector. As a result, the transmission control system can be reduced in cost.

According to another preferred embodiment of the present invention, a vehicle includes a drive wheel, an engine, a transmission arranged to transmit a torque generated by the engine to the drive wheel, a clutch provided between the engine and the transmission, and a transmission control system, wherein the transmission control system includes a shifting operation member that is operated by a driver to shift a gear position of the transmission, a clutch actuation mechanism that disconnects and connects the clutch, a shift mechanism that shifts the gear position of the transmission and a controller that controls the clutch actuation mechanism and the shift mechanism, the shifting operation member is movably provided between a first position and a second position, and the controller is arranged to start a disconnection operation of the clutch by the clutch actuation mechanism at a first time point when the shifting operation member starts to move from the first position toward the second position, complete the disconnection operation of the clutch by the clutch actuation mechanism at a second time point when the shifting operation member reaches the second position, and shift the gear position by the shift mechanism after the second time point.

In the vehicle, the torque generated by the engine is transmitted to the drive wheel through the clutch and the transmission.

Here, the vehicle is provided with the transmission control system according to a preferred embodiment of the present invention. Accordingly, in the case of gear-shifting of the transmission, the disconnection operation of the clutch is started at the first time point when the movement of the shifting operation device from the first position is started. The disconnection operation of the clutch is completed at the second time point when the shifting operation device reaches the second position. Then, the gear position of the transmission is shifted after the second time point.

In this manner, the disconnection operation of the clutch is started and then completed in a period during which the shifting operation device moves from the first position to the second position in the transmission control system. Accordingly, a driver can adjust the disconnection operation period of the clutch by adjusting an operation speed of the shifting operation device (a movement time of the shifting operation device from the first position to the second position). This allows the time required for the gear-shifting of the transmission to be adjusted according to the driver's intention. This results in improved drivability of the vehicle.

According to various preferred embodiments of the present present invention, the driver can adjust the disconnection operation period of the clutch by adjusting the operation speed of the shifting operation device (the movement time of the shifting shifting operation device from the first position to the second position). Accordingly, the time required for the gear-shifting of the transmission can be adjusted according to the driver's intention. This results in improved the drivability of the vehicle.

Other features, elements, characteristics, and advantages of the present invention will become more apparent from the following description of preferred embodiments of the present invention with reference to the attached drawings.

DETAILED DESCRIPTION OF THE PREFERRED EMBODIMENTS

Figure 1:
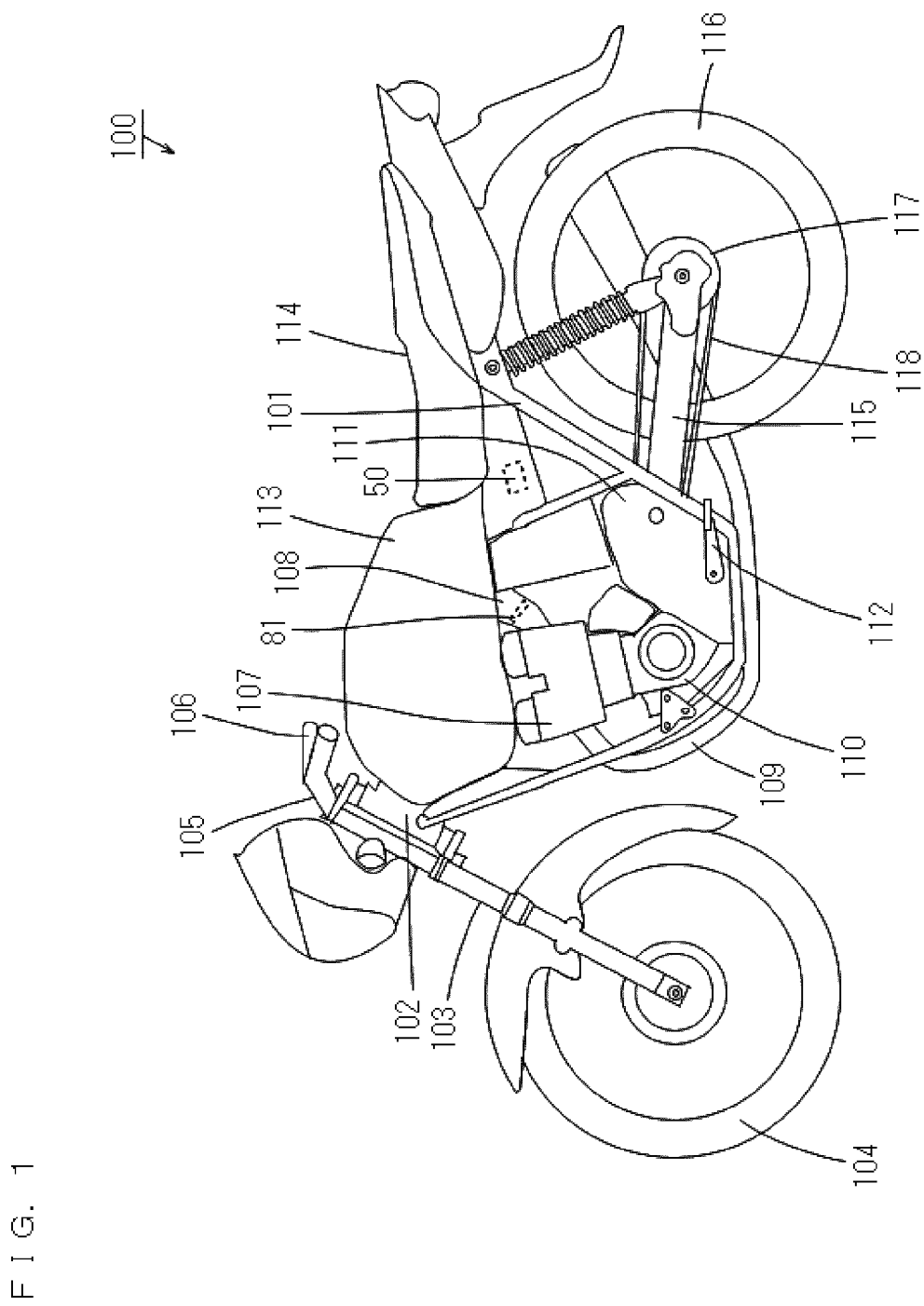
FIG. 1 is a schematic side view showing a motorcycle according to a first preferred embodiment of the present invention.

Hereinafter, description is provided of a vehicle including a transmission control system according to preferred embodiments of the present invention while referring to the drawings. Note that description is of a motorcycle as an example of the vehicle in the following paragraphs.

First Preferred Embodiment (1) Schematic Structure of Motorcycle

FIG. 1 is a schematic side view showing a motorcycle according to a first preferred embodiment of the present invention.

In the motorcycle 100 of FIG. 1, a head pipe 102 is provided at the front end of a main body frame 101. A front fork 103 is rotatably provided at the head pipe 102. At the lower end of the front fork 103, a front wheel 104 is rotatably supported. A handle 105 is provided at the upper end of the head pipe 102.

The handle 105 is provided with an accelerator grip 106. An engine 107 is provided at the center of the main body frame 101. A throttle body 108 is attached to an intake port of the engine 107, and an exhaust pipe 109 is attached to an exhaust port of the engine 107. A throttle valve 81 is provided in the throttle body 108.

A crankcase 110 is attached to a lower portion of the engine 107. A crank 2 (see FIG. 2) of the engine 107 is housed in the crankcase 110.

A transmission case 111 is provided at a lower portion of the main body frame 101. A transmission 5 (see FIG. 2) and a shift mechanism 6 (see FIG. 2), described below, are provided in the transmission case 111.

Note that it is not necessary for the driver to disconnect a clutch 3 (see FIG. 2) for switching a gear position of the transmission 5 in the present preferred embodiment. That is, a semi-automatic transmission control system that automatically switches the gear position of the transmission 5 based on a shifting operation by the driver is mounted on the motorcycle 100 according to the present preferred embodiment. Details of the transmission control system will be described later.

A fuel tank 113 is provided above the engine 107 and a seat 114 is provided in the rear of the fuel tank 113. An ECU (Electronic Control Unit) 50 is provided under the seat 114. A rear arm 115 is connected to the main body frame 101 so as to extend to the rear of the engine 107. A rear wheel 116 and a rear wheel driven sprocket 117 are rotatably held by the rear arm 115. A chain 118 is attached to the rear wheel driven sprocket 117.

(2) Structure of the Transmission and the Shift Mechanism

Next, description of the transmission and the shift mechanism provided in the transmission case 111 of FIG. 1 is provided.

Figure 2:
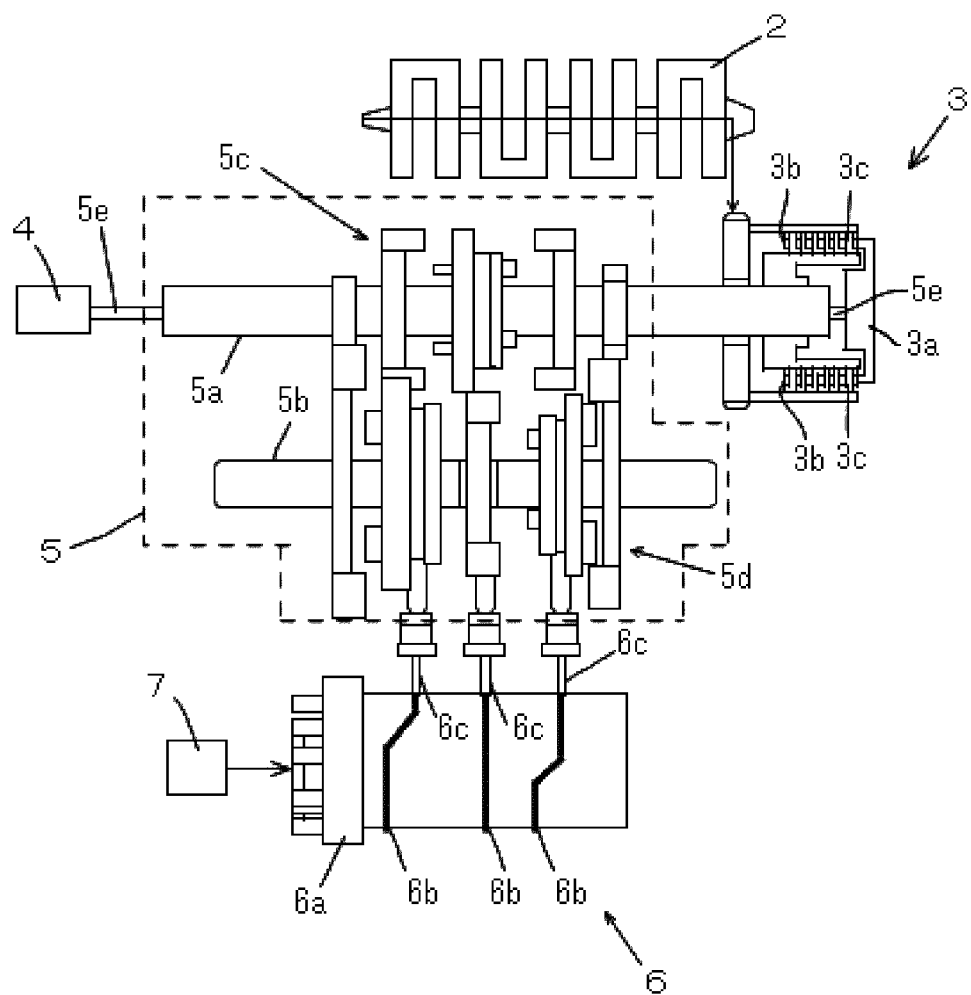
FIG. 2 is a diagram showing the structures of a transmission and a shift mechanism.

FIG. 2 is a diagram showing the structures of the transmission and the shift mechanism.

As shown in FIG. 2, the transmission 5 includes a main shaft 5a and a drive shaft 5b. Multi-stage (five-stage, for example) transmission gears 5c are attached to the main shaft 5a, and multi-stage transmission gears 5d are attached to the drive shaft 5b.

The main shaft 5a is coupled to the crank 2 of the engine 107 (FIG. 1) through the clutch 3. The clutch 3 includes a pressure plate 3a, a plurality of clutch disks 3b and a plurality of friction disks 3c. The clutch disks 3b are rotated by a torque transmitted from the crank 2. Moreover, the friction disks 3c are coupled to the main shaft 5a and rotate around the main shaft 5a as a rotation axis.

The friction disks 3c are biased by the pressure plate 3a in a direction in which the friction disks 3c come into close contact with the clutch disks 3b. A state in which the plurality of clutch disks 3b and the plurality of friction disks 3c are in close contact with one another is referred to as a connection (engagement) state of the clutch 3, and a state in which the plurality of clutch disks 3b and the plurality of friction disks 3c are separated from one another is referred to as a disconnection state of the clutch 3 in the following description. While the torque of the crank 2 is transmitted to the main shaft 5a through the clutch disks 3b and the friction disks 3c in the connection state of the clutch 3, the torque of the crank 2 is not transmitted to the main shaft 5a in the disconnection state of the clutch 3.

A push rod 5e is inserted into the main shaft 5a. One end of the push rod 5e is coupled to the pressure plate 3a, and the other end thereof is coupled to an electric or hydraulic clutch actuator 4.

In the present preferred embodiment, the push rod 5e is pushed out to the side of the clutch 3 when the clutch actuator 4 is driven under control of the ECU 50. This causes the pressure plate 3a to be pushed to cause the clutch disks 3b and the friction disks 3c to be separated from one another. As a result, the clutch 3 is brought into the disconnection state. Details of the control operation of the ECU 50 will be described later.

The torque transmitted from the crank 2 to the main shaft 5a when the clutch 3 is in the connection state is transmitted to the drive shaft 5b through the transmission gears 5c and the transmission gears 5d. The chain 118 of FIG. 1 is attached to the drive shaft 5b. The torque of the drive shaft 5b is transmitted to the rear wheel 116 (FIG. 1) through the chain 118 and the rear wheel driven sprocket 117 (FIG. 1). This causes the motorcycle 100 to be driven.

A reduction gear ratio between the main shaft 5a and the drive shaft 5b is determined by combination of the transmission gears 5c and the transmission gears 5d. Moreover, the reduction gear ratio between the main shaft 5a and the drive shaft 5b is changed by moving any transmission gears 5c, 5d of the plurality of transmission gears 5c, 5d. Note that the transmission gears 5c and the transmission gears 5d are coupled with one another by a dog mechanism in the present preferred embodiment.

The transmission gears 5c, 5d are moved by the shift mechanism 6. The shift mechanism 6 includes a shift cam 6a. A plurality of cam grooves 6b (preferably three, for example, in FIG. 2) are formed in the shift cam 6a. A shift fork 6c is attached to each cam groove 6b. The shift cam 6a is connected to an electric or hydraulic shift actuator 7 through a link mechanism that is not shown.

In the present preferred embodiment, the shift cam 6a is rotated when the shift actuator 7 is driven under control of the ECU 50. This causes each shift fork 6c to move along the cam groove 6b. As a result, any transmission gears 5c, 5d are moved to change the gear position of the transmission 5.

(3) The Transmission Control System

Next, description of the transmission control system of the motorcycle 100 will be provided.

Figure 3:
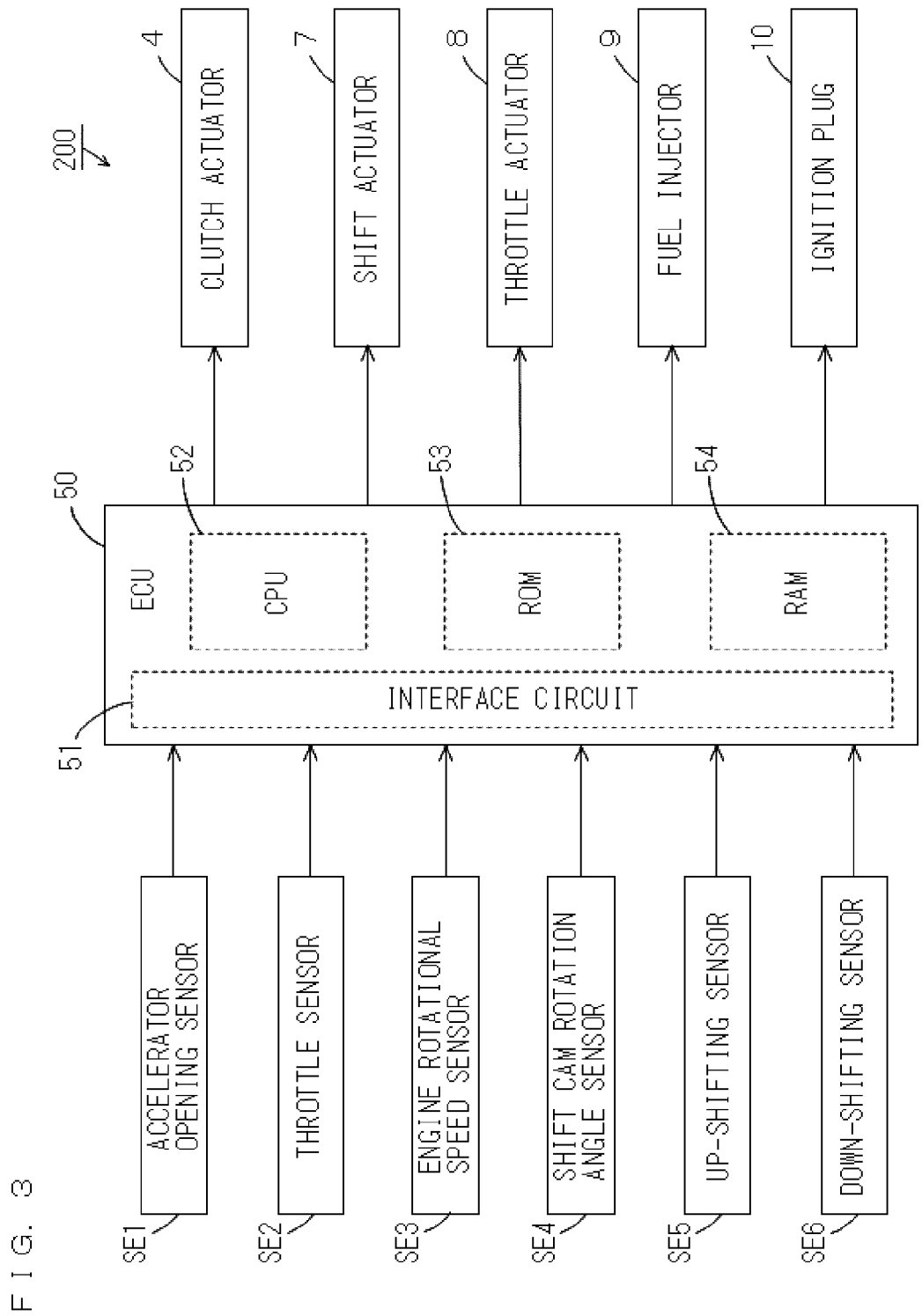
FIG. 3 is a block diagram showing the structure of a transmission control system.

FIG. 3 is a block diagram showing the structure of the transmission control system according to the present preferred embodiment.

As shown in FIG. 3, the transmission control system 200 according to the present preferred embodiment includes an accelerator opening sensor SE1, a throttle sensor SE2, an engine rotational speed sensor SE3, a shift cam rotation angle sensor SE4, an up-shifting sensor SE5, a down-shifting sensor SE6, the ECU 50, the clutch actuator 4, the shift actuator 7, a throttle actuator 8, a plurality of fuel injectors 9 and a plurality of ignition plugs 10.

The accelerator opening sensor SE1 detects an operation amount of the accelerator grip 106 (FIG. 1) (hereinafter referred to as an accelerator opening) by the driver and applies the detected accelerator opening to the ECU 50. The throttle sensor SE2 detects an opening of the throttle valve 81 (FIG. 1) (hereinafter referred to as a throttle opening) and applies the detected throttle opening to the ECU 50.

The engine rotational speed sensor SE3 detects a rotational speed of the engine 107 (FIG. 1) and applies the detected rotational speed to the ECU 50. Note that the engine rotational speed sensor SE3 detects an angular velocity of the crank 2 (FIG. 2) to detect the rotational speed of the engine 107 in the present preferred embodiment.

The shift cam rotation angle sensor SE4 detects a rotation angle of a shift cam 6a (FIG. 2) and applies the detected rotation angle to the ECU 50.

The up-shifting sensor SE5 and the down-shifting sensor SE6 include a potentiometer, a contact displacement sensor or a noncontact displacement sensor, for example. The up-shifting sensor SE5 is provided in an up-shifting operation device 91 (see FIG. 4, described later) at the handle 105 (FIG. 1), and the down-shifting sensor SE6 is provided in a down-shifting operation device 92 (see FIG. 4, described later) at the handle 105, for example.

Figure 4:
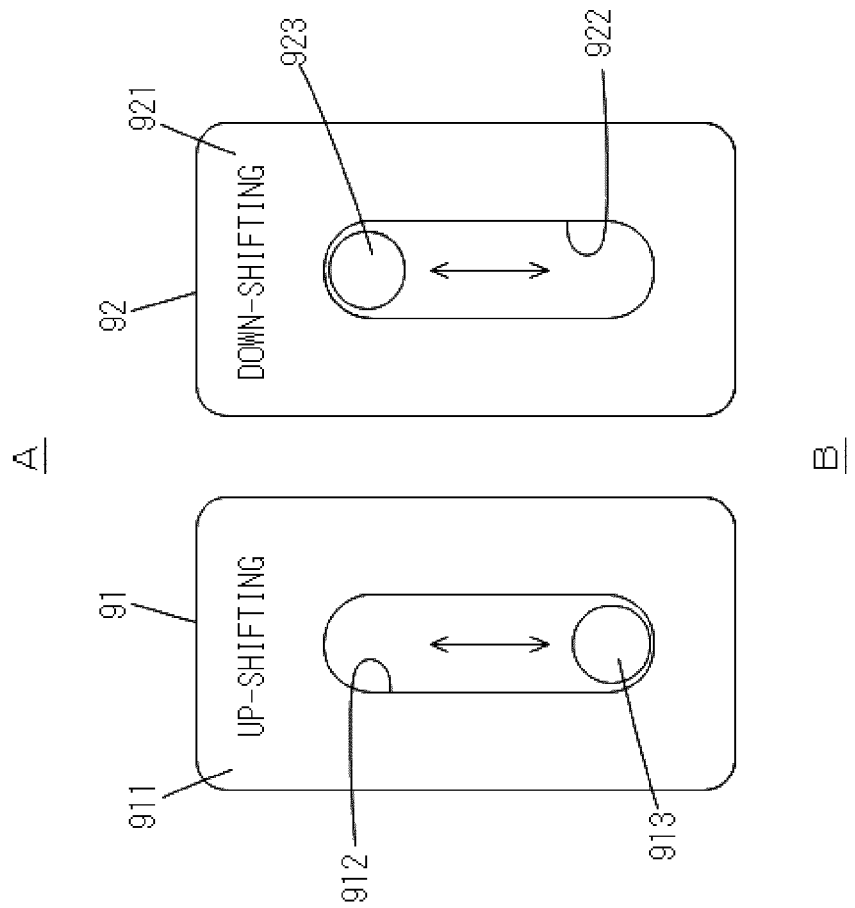
FIG. 4 is a top view showing examples of an up-shifting operation device and a down-shifting operation device.

FIG. 4 is a top view showing examples of the up-shifting operation device and the down-shifting operation device. Note that a side indicated by the character A is referred to as the front, and a side indicated by the character B is referred to as the rear for simplifying the description in FIG. 4.

As shown in FIG. 4, the up-shifting operation device 91 includes a main body 911. An opening 912 is formed at the center of the main body 911 to extend in a front-to-rear direction. The up-shifting operation device 91 includes an operation lever 913. The operation lever 913 is movably provided in the main body 911 in the front-to-rear direction within the opening 912. Note that the operation lever 913 is biased to the rear side by a biasing member that is not shown. Thus, the operation lever 913 is positioned at the rear end within the opening 912 when not being operated by the driver.

When performing the up-shifting of the transmission 5, the driver first moves the operation lever 913 to the front end within the opening 912 in the present preferred embodiment. Then, the driver releases the operation lever 913 or moves the operation lever 913 to the rear. The up-shifting sensor SE5 detects a movement amount of the operation lever 913. Specifically, the up-shifting sensor SE5 outputs a signal whose voltage value changes in proportion to a distance of the operation lever 913 from a reference position (the rear end of the opening 912).

As shown in FIG. 4, the down-shifting operation device 92 includes a main body 921 and an operation lever 923 having the same structures as those of the up-shifting operation device 91. Note that the operation lever 923 is biased to the front side by a biasing member that is not shown in the down-shifting operation device 92. Accordingly, the operation lever 923 is positioned at the front end within the opening 922 when not being operated by the driver.

When performing the down-shifting of the transmission 5, the driver first moves the operation lever 923 to the rear end within the opening 922 in the present preferred embodiment. Then, the driver releases the operation lever 923 or moves the operation lever 923 to the front. The down-shifting sensor SE6 detects a movement amount of the operation lever 923. Specifically, the down-shifting sensor SE6 outputs a signal whose voltage value changes in proportion to a distance of the operation lever 923 from a reference position (the front end of the opening 922).

As shown in FIG. 3, the ECU 50 includes an interface circuit 51, a CPU (Central Processing Unit) 52, a ROM (Read Only Memory) 53 and a RAM (Random Access Memory) 54.

Output signals from the foregoing sensors SE1 to SE6 are applied to the CPU 52 through the interface circuit 51. The CPU 52 adjusts an output of the engine 107 based on detection results of the sensors SE1 to SE6 as will be described later. A control program of the CPU 52 and so on are stored in the ROM 53. The RAM 54 stores various types of data, and functions as a processing area of the CPU 52.

The shift actuator 7 is electric or hydraulic, for example, and rotates the shift cam 6a (FIG. 2) under control of the CPU 52. The throttle actuator 8 includes an electric motor, for example, and adjusts an opening of the throttle valve 81 under control of the CPU 52. The fuel injector 9 is provided in each cylinder of the engine 107. The ignition plug 10 is provided in each cylinder of the engine 107.

(4) Control Operation of the CPU

Description of a control operation of the CPU 52 in normal driving of the motorcycle 100 and the gear-shifting of the transmission 5 is provided below.

(a) Control Operation in the Normal Driving

During the normal driving of the motorcycle 100, the CPU 52 controls the throttle actuator 8, the fuel injectors 9 and the ignition plugs 10 based on the accelerator opening detected by the accelerator opening sensor SE1. The throttle opening, an amount of injected fuel and an ignition timing of an air-fuel mixture are adjusted, thus adjusting an output of the engine 107. Note that the relationship between the accelerator opening and the throttle opening is previously stored in the ROM 53 (or the RAM 54) of the ECU 50.

In addition, the CPU 52 performs a feedback control on the throttle actuator 8 based on the throttle opening detected by the throttle sensor SE2. This causes the throttle opening to be more suitably adjusted.

(b) The Up-Shifting Control

Next, description of the control operation of the CPU 52 in the up-shifting of the transmission 5 will be provided.

Figure 5:
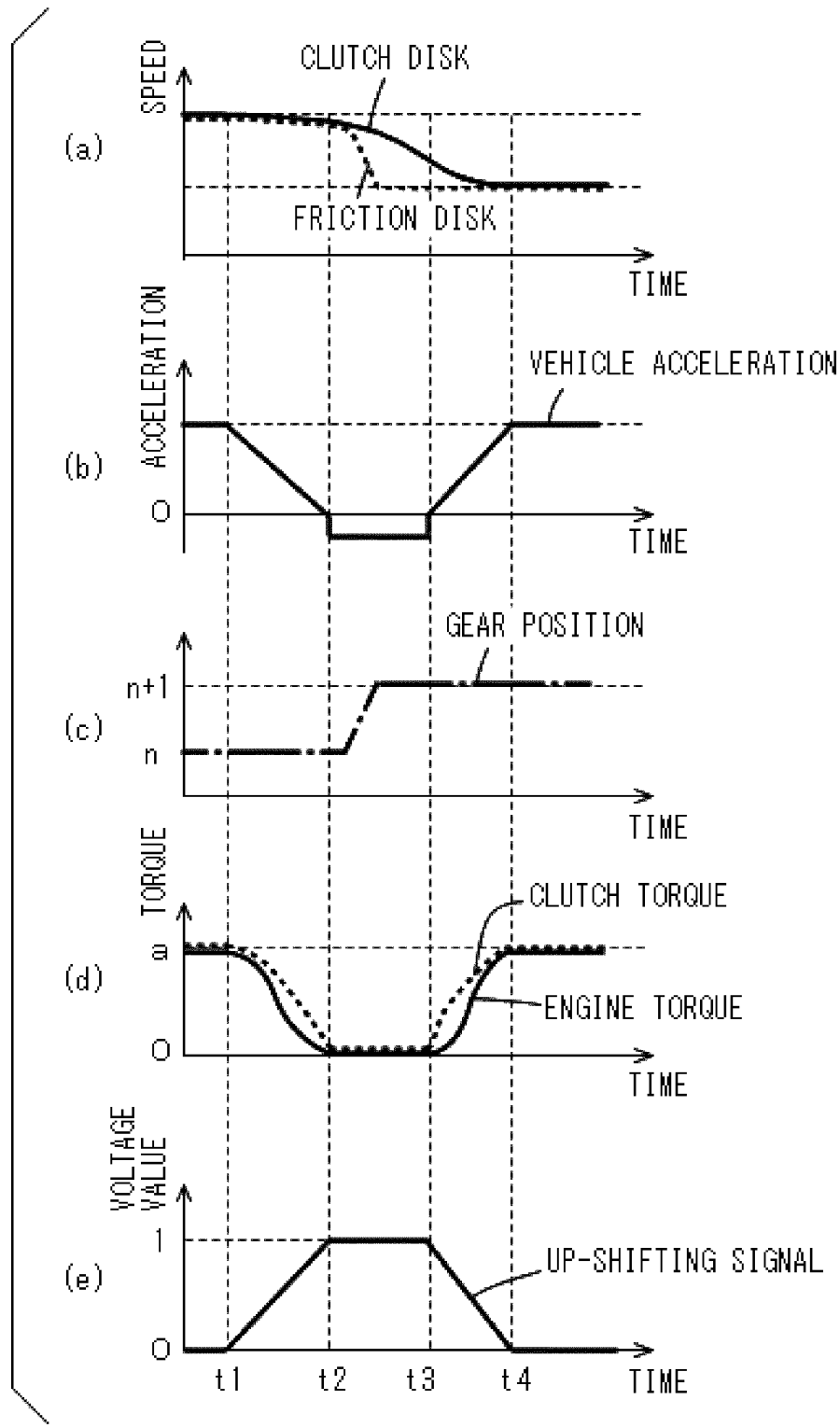
FIG. 5 is a diagram for explaining a control operation of a CPU in up-shifting.

FIG. 5 is a diagram for explaining the control operation of the CPU 52 in the up-shifting. In FIG. 5, (a) shows change with time of a rotational speed of the clutch disks 3b (FIG. 2) and change with time of a rotational speed of the friction disks 3c (FIG. 2), (b) shows change with time of acceleration of the motorcycle 100, (c) shows change with time of the gear position of the transmission 5, (d) shows change with time of the torque generated in the engine 107 and change with time of a transmission torque (friction torque) of the clutch 3, and (e) shows change with time of the voltage value of the output signal of the up-shifting sensor SE5 (hereinafter referred to as an up-shifting signal).

Note that in (a) of FIG. 5, the solid line indicates the change with time of the rotational speed of the clutch disks 3b (FIG. 2) and the dotted line indicates the change with time of the rotational speed of the friction disks 3c (FIG. 3). In (d) of FIG. 5, the solid line indicates the change with time of the torque generated in the engine 107 (hereinafter referred to as the engine torque), and the dotted line indicates the change with time of the transmission torque of the clutch 3 (hereinafter referred to as the clutch torque).

The engine torque attains a positive value when the clutch disks 3b of the clutch 3 are driven by the engine 107, and the engine torque attains a negative value when the engine 107 is driven by the clutch disks 3b of the clutch 3.

The clutch torque attains a positive value when the torque is transmitted from the clutch disks 3b of the clutch 3 to the friction disks 3c, and the clutch torque attains a negative value when the torque is transmitted from the friction disks 3c of the clutch 3 to the friction disks 3c.

As described above, the voltage value of the up-shifting signal changes in proportion to the movement amount of the operation lever 913 (FIG. 4) in the present preferred embodiment. In (e) of FIG. 5, the voltage value of the up-shifting signal when the operation lever 913 is at the reference position is defined as zero, and the voltage value of the up-shifting signal when the movement amount of the operation lever 913 from the reference position is maximized is defined as one.

A detailed description of the control operation of the CPU 52 in the up-shifting mode will be provided.

As shown in (d) and (e) of FIG. 5, the driver moves the operation lever 913 (FIG. 4) to the front at a time point t1 to cause the clutch toque and the engine torque to decrease from a value a to zero in the present preferred embodiment. Specifically, the engine torque and the clutch torque decrease to form respective waveforms corresponding to an increase of the voltage value of the up-shifting signal so as to attain zero at a time point t2 when the voltage value of the up-shifting signal attains one (a maximum value).

Thus, when the voltage value of the up-shifting signal gradually increases, that is, when the driver gradually moves the operation lever 913 (FIG. 4) to the front, the clutch torque and the engine torque gradually decrease.

When the voltage value of the up-shifting signal quickly increases, that is, when the driver quickly moves the operation lever 913 to the front, the clutch torque and the engine torque quickly decrease.

Note that the clutch 3 is completely disconnected at the time point t2 when the clutch torque attains zero in the example of FIG. 5. The clutch torque decreases in a period from the time point t1 to t2 to decrease the acceleration of the motorcycle 100 as shown in (b) of FIG. 5.

Here, a map representing the relationship between the voltage value and a target value of the clutch torque is previously stored in the ROM 53 (or the RAM 54) of the ECU 50, for example, in order to decrease the clutch torque corresponding to the increase of the voltage value of the up-shifting signal in the period from the time point t1 to t2 in the present preferred embodiment.

Figure 6:
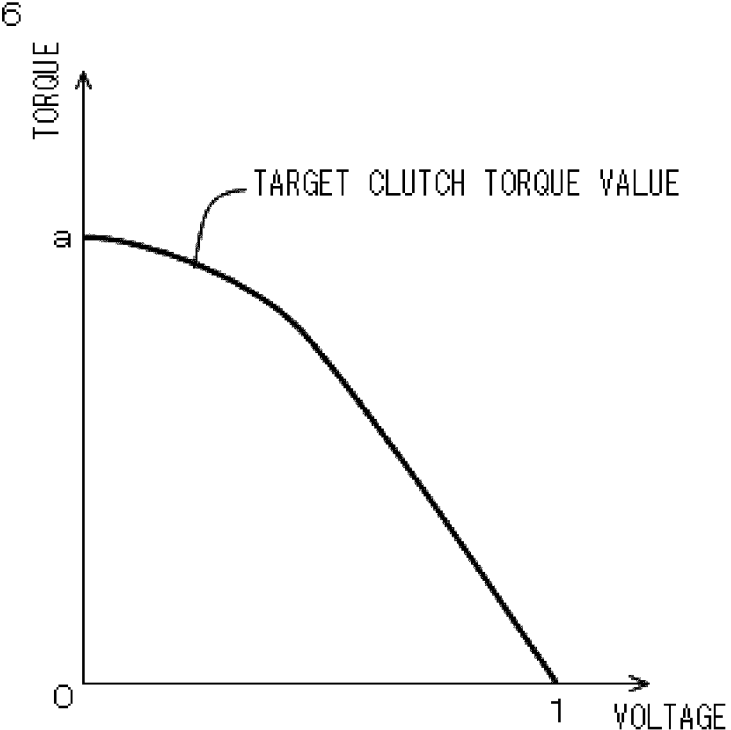
FIG. 6 is a diagram showing an example of a map stored in an ECU.

FIG. 6 is a diagram showing an example of the map used in the period from the time point t1 to t2. An arbitrary voltage value and the target value of the clutch torque are associated with each other in the map shown in FIG. 6. Accordingly, the CPU 52 can calculate change with time of the target value of the clutch torque from the map shown in FIG. 6 based on the change with time of the voltage value of the up-shifting signal for decreasing the clutch torque in the period from the time point t1 to t2 of FIG. 5.

Then, the CPU 52 controls the clutch actuator 4 such that the change with time of the clutch torque generated in the clutch 3 is equal to the change with time of the calculated target value in the period from the time point t1 to t2. Thus, the clutch torque can be decreased so as to form the waveform corresponding to the increase of the voltage value of the up-shifting signal.

In the present preferred embodiment, a map representing the relationship between the voltage value and a target value of the engine torque is previously stored in the ROM 53 (or the RAM 54), for example, in order to decrease the engine torque corresponding to the increase of the voltage value of the up-shifting signal in the period from the time point t1 to t2.

Figure 7:
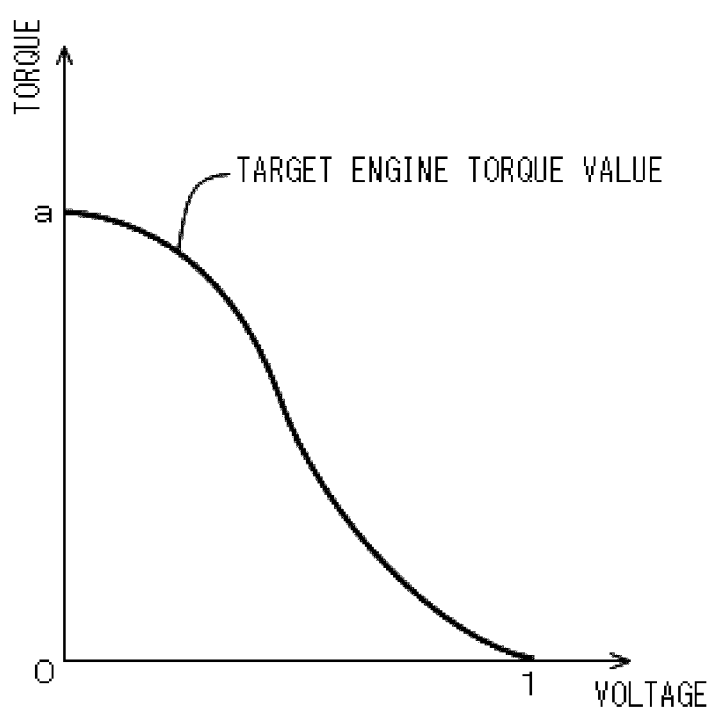
FIG. 7 is a diagram showing an example of the map stored in the ECU.

FIG. 7 is a diagram showing an example of the map used in the period from the time point t1 to t2. In the map shown in FIG. 7, an arbitrary voltage value and the target value of the engine torque are associated with each other. Thus, the CPU 52 can calculate change with time of the target value of the engine torque from the map shown in FIG. 7 based on the change with time of the voltage value of the up-shifting signal for decreasing the engine torque in the period from the time point t1 to t2 of FIG. 5.

Then, the CPU 52 controls each component (the throttle actuator 8, the fuel injectors 9 and the ignition plugs 10, for example) such that the engine torque generated in the engine 107 is equal to the change with time of the calculated target value in the period from the time point t1 to t2. Accordingly, the engine torque can be decreased so as to form the waveform corresponding to the increase of the voltage value of the up-shifting signal.

Note that the value a in the maps of FIGS. 6 and 7 is a variable, and the clutch torque and the engine torque at the time point t1 (FIG. 5) attain the value a.

Then, the gear position of the transmission 5 is shifted up by one stage after the time point t2 when the clutch 3 is disconnected as shown in (c), (d) and (e) of FIG. 5. This causes the rotational speed of the friction disks 3c (the main shaft 5a (FIG. 2)) to be decreased as shown in (a) of FIG. 5.

Next, the driver moves the operation lever 913 (FIG. 4) to the rear at a time point t3 to cause the engine torque and the clutch torque to increase from zero to the value a as shown in (d) and (e) of FIG. 5. Specifically, the engine torque and the clutch torque increase to form the respective waveforms corresponding to the decrease of the voltage value of the up-shifting signal so as to return to the value a at a time point t4 when the voltage value of the up-shifting signal attains zero.

Thus, when the voltage value of the up-shifting signal gradually decreases, that is, when the driver gradually moves the operation lever 913 (FIG. 4) to the rear, the engine torque and the clutch torque gradually increase.

When the voltage value of the up-shifting signal quickly decreases, that is, when the driver quickly moves the operation lever 913 to the rear, the engine torque and the clutch torque quickly increase.

Note that in the example of FIG. 5, connection of the clutch 3 is started at the time point t3 when the increase of the clutch toque is started. That is, the clutch 3 is half-clutched at the time point t3. Thus, the rotational speed of the clutch disks 3b decreases to gradually come close to the rotational speed of the friction disks 3c as shown in (a) of FIG. 5.

Here, a map representing the relationship between the voltage value and the target value of the clutch torque is previously stored in the ROM 53 (or the RAM 54) of the ECU 50, for example, in order to increase the clutch torque corresponding to the decrease of the voltage value of the up-shifting signal in a period from the time point t3 to t4 in the present preferred embodiment.

Figure 8:
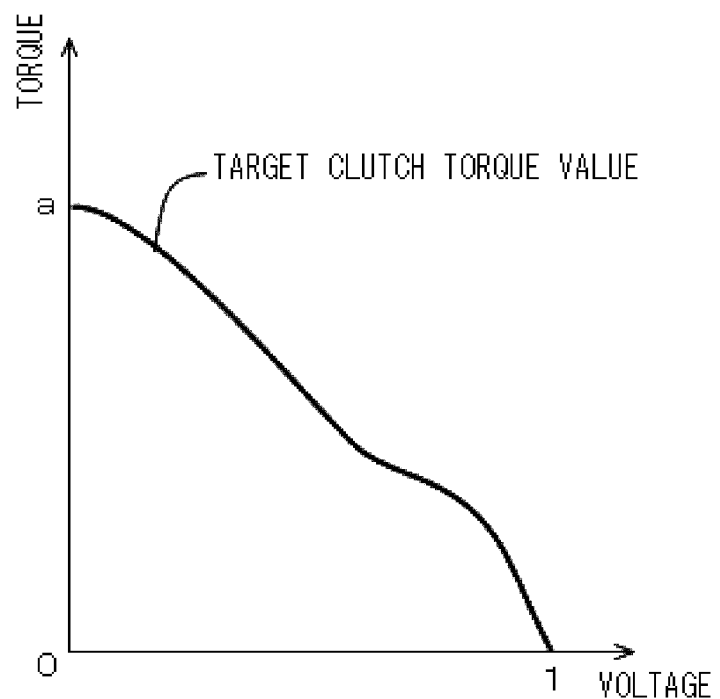
FIG. 8 is a diagram showing an example of the map stored in the ECU.

FIG. 8 is a diagram showing an example of the map used in the period from the time point t3 to t4. An arbitrary voltage value and the target value of the clutch torque are associated with each other in the map shown in FIG. 8. Accordingly, the CPU 52 can calculate the change with time of the target value of the clutch torque from the map shown in FIG. 8 based on the change with time of the voltage value of the up-shifting signal for increasing the clutch torque in the period from the time point t3 to t4 of FIG. 5.

Then, the CPU 52 controls the clutch actuator 4 such that the change with time of the clutch torque generated in the clutch 3 is equal to the change with time of the calculated target value in the period from the time point t3 to t4. Accordingly, the clutch torque can be increased so as to form the waveform corresponding to the decrease of the voltage value of the up-shifting signal.

The CPU 52 can calculate the change with time of the target value of the engine torque from the map shown in FIG. 7 based on the change with time of the voltage value of the up-shifting signal, for example, for increasing the engine torque in the period from the time point t3 to t4.

Then, the CPU 52 controls each component (the throttle actuator 8, the fuel injectors 9, and the ignition plugs 10, for example), such that the change with time of the engine torque generated in the engine 107 is equal to the change with time of the calculated target value in the period from the time point t3 to t4. Accordingly, the engine torque can be increased so as to form the waveform corresponding to the decrease of the voltage value of the up-shifting signal.

Note that the value a in the map of FIG. 8 is a variable, and the clutch torque at the time point t1 (FIG. 5) attains the value a.

In the example of FIG. 5, the clutch 3 is connected at the time point t4 when the clutch torque returns to the value a before the up-shifting. This causes the rotational speed of the clutch disks 3b and the rotational speed of the friction disks 3c to substantially coincide with each other at the time point t4 as shown in (a) of FIG. 5. In this manner, the up-shifting control of the transmission 5 is finished.

As described above, the clutch 3 is disconnected when the voltage value of the up-shifting signal is increased to one, and the clutch 3 is connected when the voltage value of the up-shifting signal is decreased to zero in the present preferred embodiment. Accordingly, the driver can adjust respective lengths of the disconnection operation period of the clutch 3 (the period from the time point t1 to t2 of FIG. 5), the period for switching the gear position (the period from the time point t2 to t3 of FIG. 5) and the connection operation period of the clutch 3 (the period from the time point t3 to t4 of FIG. 5) by adjusting the operation speed of the operation lever 913 (FIG. 4) of the up-shifting operation device 91 (FIG. 4). In this case, the time required for the up-shifting of the transmission 5 can be adjusted according to the driver's intention, thus improving the drivability of the motorcycle 100.

In the present preferred embodiment, the values of the engine torque and the clutch torque change corresponding to the change of the voltage value of the up-shifting signal. Thus, the driver can adjust the rates of decrease and the rates of increase of the engine torque and the clutch torque by adjusting the operation speed of the operation lever 913. In this case, the engine torque and the clutch torque can be decreased and increased at the rates according to the driver's intention in the up-shifting of the transmission 5. This further improves the drivability of the motorcycle 100.

(c) Down-Shifting Control

Next, description of the control operation of the CPU 52 in the down-shifting of the transmission 5 will be provided.

Figure 9:
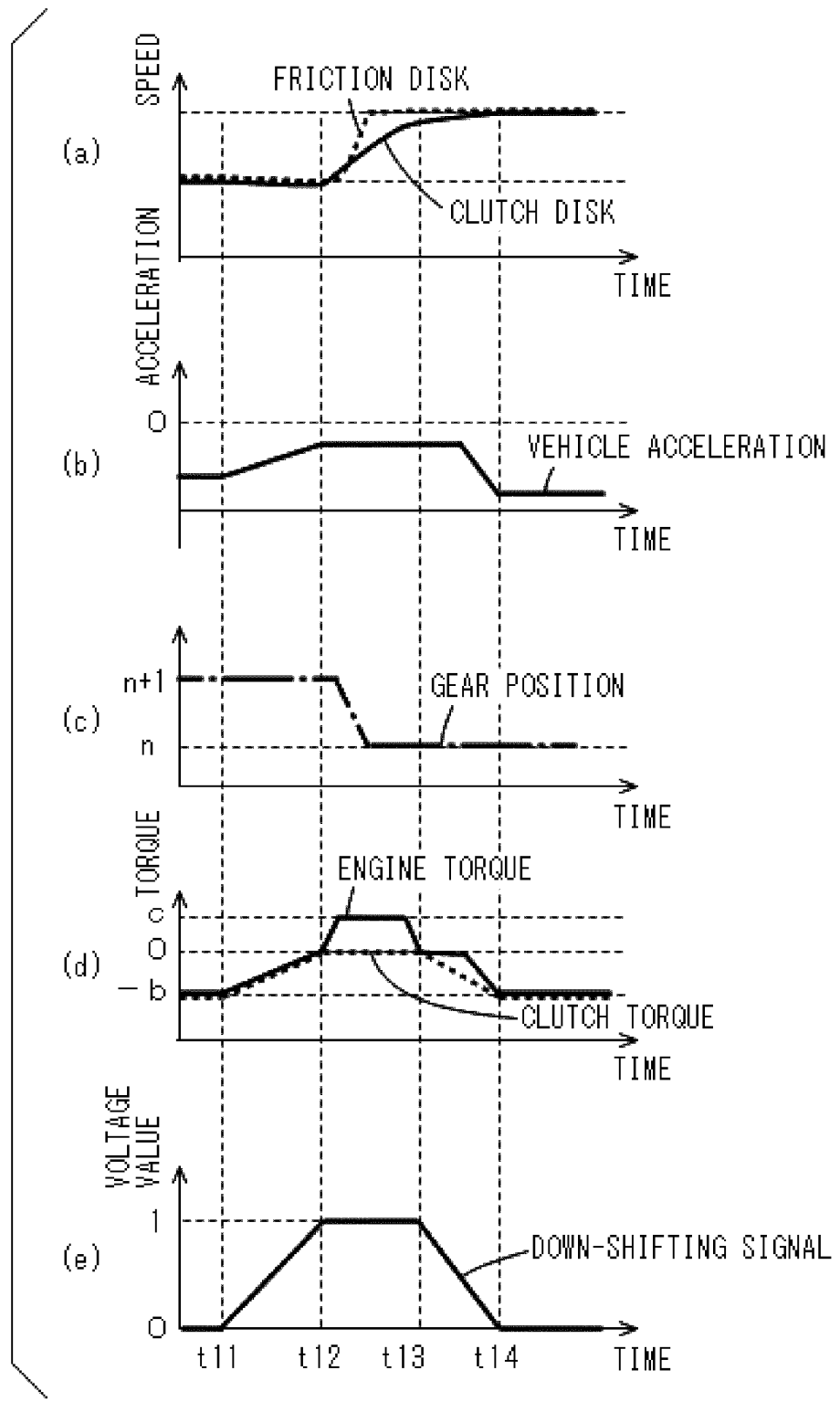
FIG. 9 is a diagram for explaining a control operation of the CPU 52 in down-shifting.

FIG. 9 is a diagram for explaining the control operation of the CPU 52 in the down-shifting. In FIG. 9, (a) shows change with time of the rotational speed of the clutch disks 3b (FIG. 2) and change with time of the rotational speed of the friction disks 3c (FIG. 2), (b) shows change with time of acceleration of the motorcycle 100, (c) shows change with time of the gear position of the transmission 5, (d) shows change with time of the engine torque and change with time of the clutch torque, and (e) shows change with time of the voltage value of an output signal of the down-shifting sensor SE6 (hereinafter referred to as a down-shifting signal).

As described above, the voltage value of the down-shifting signal changes in proportion to the movement amount of the operation lever 923 (FIG. 4) in the present preferred embodiment. In (e) of FIG. 9, the voltage value of the down-shifting signal when the operation lever 923 is at the reference position is defined as zero, and the voltage value of the down-shifting signal when the movement amount of the operation lever 923 from the reference position is maximized is defined as one.

Hereinafter, detailed description of the control operation of the CPU 52 in the down-shifting will be provided.

As shown in (d) and (e) of FIG. 9, the driver moves the operation lever 923 (FIG. 4) to the rear at a time point t11 to cause the clutch torque and the engine torque to increase from a negative value −b in the present preferred embodiment. That is, absolute values of the clutch torque and the engine torque decrease.

Specifically, the clutch torque increases to form a waveform corresponding to the increase of the voltage value of the down-shifting signal so as to attain zero at a time point t12 when the voltage value of the down-shifting signal attains one (a maximum value). Similarly, the engine torque increases to form a waveform corresponding to the increase of the voltage value of the down-shifting signal so as to attain zero at the time point t12.

Thus, when the voltage value of the down-shifting signal gradually increases, that is, when the driver gradually moves the operation lever 923 (FIG. 4) to the rear, the absolute values of the clutch torque and the engine torque gradually decrease.

When the voltage value of the down-shifting signal quickly increases, that is, when the driver quickly moves the operation lever 923 to the rear, the absolute values of the clutch torque and the engine torque quickly decrease.

Note that in the example of FIG. 9, the clutch 3 is completely disconnected at the time point t12 when the clutch torque attains zero. This causes the rotational speed of the clutch disks 3b (the crank 2 (FIG. 2)) to increase as shown in (a) of FIG. 9. In addition, the negative absolute value of the clutch torque decreases in a period from a time point t11 to t12 to cause the acceleration of the motorcycle 100 to increase from the negative value as shown in (b) of FIG. 9. That is, deceleration of the motorcycle 100 decreases.

Here, the CPU 52 can calculate change with time of the target value of the clutch torque from a map that is the same as that shown in FIG. 6 based on the change with time of the voltage value of the down-shifting signal, for example, for decreasing the absolute value of the clutch torque in the period from the time point t11 to t12. In this case, the negative value −b is set at the ordinate of the map.

Then, the CPU 52 controls the clutch actuator 4 such that the change with time of the clutch torque generated in the clutch 3 is equal to the change with time of the calculated target value in the period from the time point t11 to t12. Accordingly, the absolute value of the clutch torque can be decreased to form a waveform corresponding to the increase of the voltage value of the down-shifting signal.

The CPU 52 can calculate change with time of the target value of the engine torque from a map that is the same as that shown in FIG. 7 based on the change with time of the voltage value of the down-shifting signal, for example, for decreasing the absolute value of the engine torque in the period from the time point t11 to t12 of FIG. 9. In this case, the negative value −b is set at the ordinate of the map.

Then, the CPU 52 controls each component (the throttle actuator 8, the fuel injectors 9 and the ignition plugs 10, for example) such that the change with time of the engine torque generated in the engine 107 is equal to the change with time of the calculated target value in the period from the time point t11 to t12. Accordingly, the absolute value of the engine torque can be decreased to form a waveform corresponding to the increase of the voltage value of the down-shifting signal.

In a period from the time point t12 to t13, the engine torque attains a positive value c as shown in (d) and (e) of FIG. 9. The gear position of the transmission 5 is shifted down by one stage after the time point t12 when the clutch 3 is disconnected as shown in (c), (d) and (e) of FIG. 9. This causes the rotational speed of the friction disks 3c (the main shaft 5a (FIG. 2)) to increase as shown in (a) of FIG. 9.

Next, the driver moves the operation lever 923 (FIG. 4) to the front at the time point t3 to cause the engine torque and the clutch torque to decrease from zero to the negative value −b as shown in (d) and (e) of FIG. 9. That is, the absolute values of the clutch torque and the engine torque increase. Specifically, the engine torque and the clutch torque decrease to form respective waveforms corresponding to the decrease of the voltage value of the down-shifting signal so as to return to the negative value −b at a time point t14 when the voltage value of the down-shifting signal attains zero.

Accordingly, when the voltage value of the down-shifting signal gradually increases, that is, when the driver gradually moves the operation lever 923 (FIG. 4) to the front, the absolute values of the engine torque and the clutch torque gradually increase.

When the voltage value of the down-shifting signal quickly increases, that is, when the driver quickly moves the operation lever 923 to the front, the absolute values of the engine torque and the clutch torque quickly increase.

Note that in the example of FIG. 9, the connection of the clutch 3 is started at the time point t13 when the increase of the absolute value of the clutch torque is started. That is, the clutch 3 is half-clutched at the time point t13. Thus, the rotational speed of the clutch disks 3b increases to gradually come close to the rotational speed of the friction disks 3c as shown in (a) of FIG. 9.

Here, the CPU 52 calculates the change with time of the target value of the clutch torque from a map that is the same as that shown in FIG. 6 based on the change with time of the voltage value of the down-shifting signal, for example, for increasing the absolute value of the clutch torque in a period from the time point t13 to t14. In this case, the negative value −b is set at the ordinate of the map.

Then, the CPU 52 controls the clutch actuator 4 such that the change with time of the clutch torque generated in the clutch 3 is equal to the change with time of the calculated target value in the period from the time point t13 to t14. Thus, the absolute value of the clutch torque can be increased so as to form the waveform corresponding to the decrease of the voltage value of the down-shifting signal.

In addition, a map representing the relationship between the voltage value and the target value of the engine torque is previously stored in the ROM 53 (or the RAM 54) of the ECU 50, for example, in order to increase the absolute value of the engine torque corresponding to the decrease of the down-shifting signal in the period from the time point t13 to t14 in the present preferred embodiment.

Figure 10:
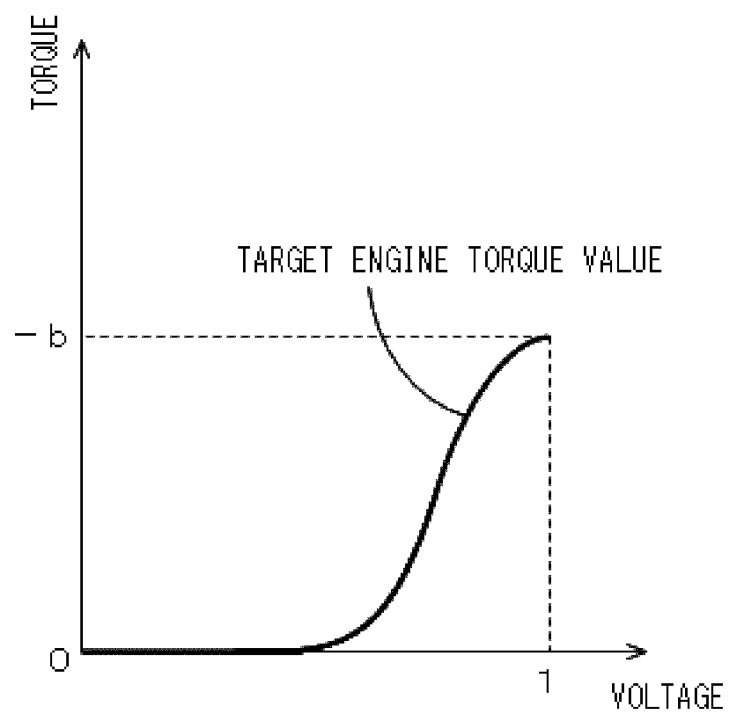
FIG. 10 is a diagram showing an example of the map stored in the ECU.

FIG. 10 is a diagram showing an example of the map used in the period from the time point t13 to t14. An arbitrary voltage value and the target value of the engine torque are associated with each other in the map shown in FIG. 10. Thus, the CPU 52 calculates the change with time of the target value of the engine torque from the map shown in FIG. 10 based on the change with time of the voltage value of the down-shifting signal, for example, for increasing the absolute value of the engine torque in the period from the time point t13 to t14.

Then, the CPU 52 controls each component (the throttle actuator 8, the fuel injectors 9 and the ignition plugs 10, for example) such that the change with time of the engine torque generated in the engine 107 is equal to the change with time of the calculated target value in the period from the time point t13 to t14. Thus, the absolute value of the engine torque can be increased so as to form the waveform corresponding to the decrease of the voltage value of the down-shifting signal.

Note that in the example of FIG. 9, the clutch 3 is connected at the time point t14 when the clutch torque returns to the value −b before the down-shifting. This causes the rotational speed of the clutch disks 3b and the rotational speed of the friction disks 3c to substantially coincide with each other at the time point t14 as shown in (a) of FIG. 9. In this manner, the down-shifting control of the transmission 5 is finished.

As described above, the clutch 3 is disconnected when the voltage value of the down-shifting signal is increased to one and the clutch 3 is connected when the voltage value of the down-shifting signal is decreased to zero in the present preferred embodiment. Accordingly, the driver can adjust respective lengths of a disconnection operation period of the clutch 3 (the period from the time point t11 to t12 of FIG. 9), a period for switching the gear position (the period from the time point t12 to t13 of FIG. 9) and a connection operation period of the clutch 3 (the period from the time point t13 to t14 of FIG. 9) by adjusting the operation speed of the operation lever 923 (FIG. 4) of the down-shifting operation device 92 (FIG. 4). In this case, the time required for the down-shifting of the transmission 5 can be adjusted according to the driver's intention, thus improving the drivability of the motorcycle 100.

The values of the engine torque and the clutch torque change corresponding to the change of the voltage value of the down-shifting signal in the present preferred embodiment. The driver can adjust the rates of decrease and the rates of increase of the absolute values of the engine torque and the clutch torque by adjusting the operation speed of the operation lever 923. In this case, the engine torque and the clutch torque can be decreased and increased at the rates according to the driver's intention in the down-shifting of the transmission 5. Accordingly, the drivability of the motorcycle 100 is further improved.

(d) Control Flow

Next, description of a control flow of the CPU 52 in the gear-shifting of the transmission 5 will be provided.

Figure 11:
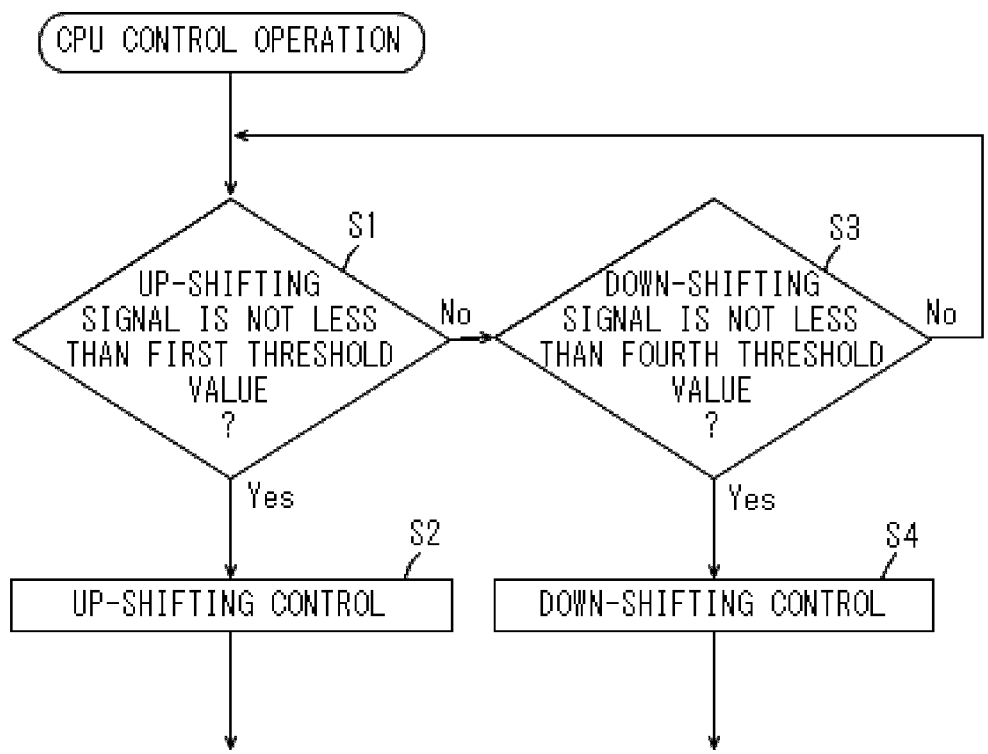
FIG. 11 is a flowchart showing an example of the operation of the CPU in gear-shifting.
Figure 12:
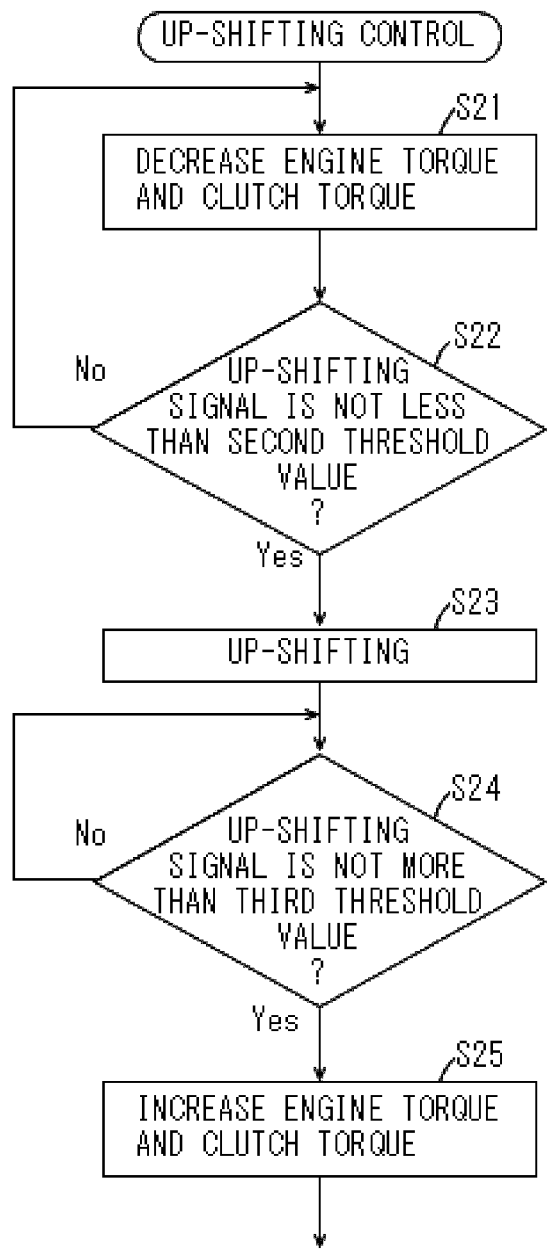
FIG. 12 is a flowchart showing an example of the operation of the CPU in the gear-shifting.
Figure 13:
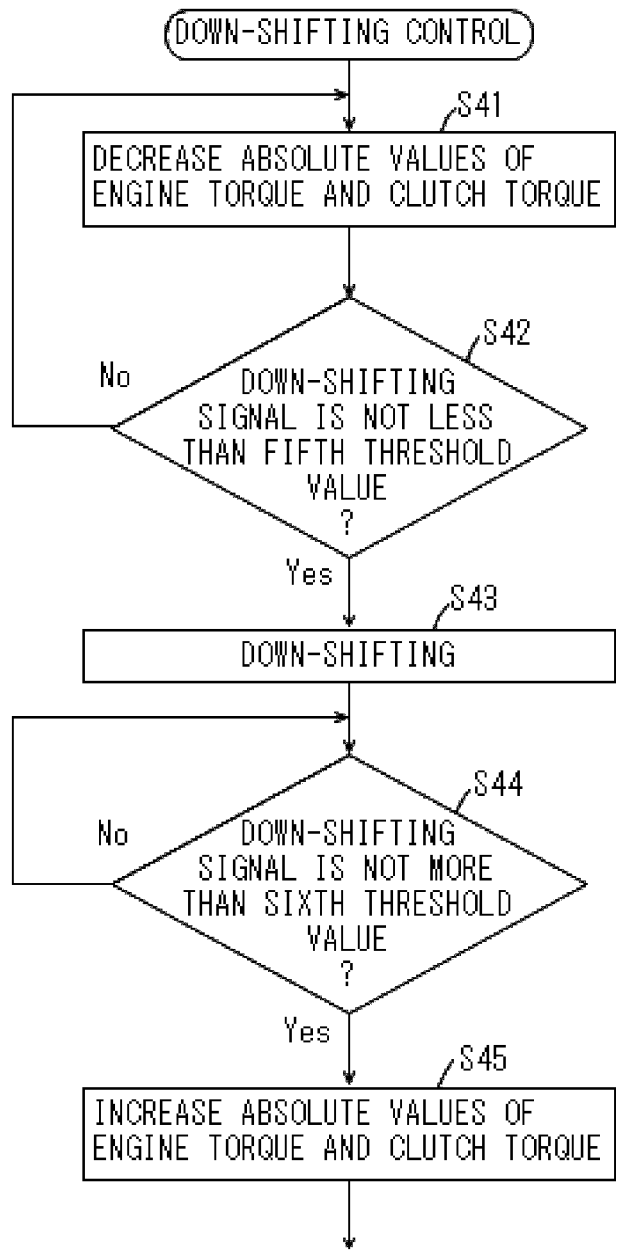
FIG. 13 is a flowchart showing an example of the operation of the CPU in the gear-shifting.

FIGS. 11, 12 and 13 are flowcharts showing an example of the operation of the CPU 52 in the gear-shifting.

As shown in FIG. 11, the CPU 52 first determines whether the voltage value of the up-shifting signal is not less than a first threshold value (Step S1). Note that the first threshold value is preferably set to 0.02, for example, when the maximum value of the voltage value of the up-shifting signal is 1.

When the voltage value of the up-shifting signal is not less than the first threshold value, the CPU 52 determines that the driver has moved the operation lever 913 (FIG. 4) to the front, and performs the up-shifting control described with reference to FIG. 5 (Step S2).

Specifically, the CPU 52 first decreases the engine torque and the clutch torque corresponding to the increase of the voltage value of the up-shifting signal as shown in FIG. 12 (Step S21).

Next, the CPU 52 determines whether the voltage value of the up-shifting signal is not less than a second threshold value (Step S22). Note that the second threshold value is preferably set to 0.99, for example, when the maximum value of the up-shifting signal is 1.

When the voltage value of the up-shifting signal is not less than the second threshold value, the CPU 52 determines that the clutch 3 is disconnected, and performs the up-shifting of the transmission 5 (Step S23). Specifically, the CPU 52 controls the shift actuator 7 (FIG. 2) to rotate the shift cam 6a (FIG. 2). This causes the shift forks 6c (FIG. 2) to move, moving the transmission gears 5c (FIG. 2) or the transmission gears 5d (FIG. 2). As a result, the gear position of the transmission 5 is shifted up by one stage.

Next, the CPU 52 determines whether the voltage value of the up-shifting signal is not more than a third threshold value (Step S24). Note that the third threshold value is preferably set to 0.97, for example, when the maximum value of the up-shifting signal is 1.

When the voltage value of the up-shifting signal is not more than the third threshold value, the CPU 52 determines that the driver has moved the operation lever 913 to the rear or released the operation lever 913, and increases the engine torque and the clutch torque corresponding to the up-shifting signal (Step S25). Then, the clutch 3 is completely connected to finish the up-shifting control.

When the voltage value of the up-shifting signal is smaller than the second threshold value in Step S22, the CPU 52 determines that the disconnection operation of the clutch 3 is not finished, and repeats the processes of Steps S21 and S22 until the voltage value of the up-shifting signal attains the second threshold value or more.

When the voltage value of the up-shifting signal is larger than the third threshold value in Step S24, the CPU 52 waits until the voltage value of the up-shifting signal attains the third threshold value or less.

When the voltage value of the up-shifting signal is smaller than the first threshold value in Step S1 of FIG. 11, the CPU 52 determines that the up-shifting operation is not performed by the driver, and determines whether the voltage value of the down-shifting signal is not less than a fourth threshold value (Step S3). Note that the fourth threshold value is preferably set to 0.02, for example, when the maximum value of the voltage value of the down-shifting signal is 1.

When the voltage value of the down-shifting signal is not less than the fourth threshold value, the CPU determines that the driver has moved the operation lever 923 (FIG. 4) to the rear and performs the down-shifting control described with reference to FIG. 9 (Step S4).

Specifically, the CPU 52 first decreases the absolute values of the engine torque and the clutch torque corresponding to the increase of the voltage value of the down-shifting signal as shown in FIG. 13 (Step S41).

Next, the CPU 52 determines whether the voltage value of the down-shifting signal is not less than a fifth threshold value (Step S42). Note that the fifth threshold value is set to 0.99, for example, when the maximum value of the down-shifting signal is 1.

When the voltage value of the down-shifting signal is not less than the fifth threshold value, the CPU 52 determines that the clutch 3 is disconnected, and performs the down-shifting of the transmission 5 (step S43). Specifically, the CPU 52 controls the shift actuator 7 (FIG. 2) to rotate the shift cam 6a (FIG. 2). This causes the shift forks 6c (FIG. 2) to move, moving the transmission gears 5c (FIG. 2) or the transmission gears 5d (FIG. 2). As a result, the gear position of the transmission 5 is shifted down by one stage.

Next, the CPU 52 determines whether the voltage value of the down-shifting signal is not more than a sixth threshold value (step S44). Note that the sixth threshold value is preferably set to 0.97, for example, when the maximum value of the down-shifting signal is 1.

When the voltage value of the down-shifting signal is not more than the sixth threshold value, the CPU 52 determines that the driver has moved the operation lever 923 to the front or released the operation lever 923, and increases the absolute values of the engine torque and the clutch torque corresponding to the down-shifting signal (Step S45). Then, the clutch 3 is completely connected to finish the down-shifting control.

When the voltage value of the down-shifting signal is smaller than the fifth threshold value in Step S42, the CPU 52 determines that the disconnection operation of the clutch 3 is not finished, and repeats the processes of Steps S41 and S42 until the voltage value of the down-shifting signal attains the fifth threshold value or more.

When the voltage value of the down-shifting signal is larger than the sixth threshold value in Step S44, the CPU 52 waits until the voltage value of the down-shifting signal attains the sixth threshold value or less.

When the voltage value of the down-shifting signal is smaller than the fourth threshold value in Step S3 of FIG. 11, the CPU 52 determines that the shifting operation is not performed by the driver and returns to the process of Step S1.

(5) Effects and Advantages of the Present Preferred Embodiment

In the transmission control system 200 according to the present preferred embodiment, the driver can adjust the lengths of the disconnection operation period of the clutch 3, the period for switching the gear position and the connection operation period of the clutch 3 by adjusting the operation speeds of the operation lever 913 (FIG. 4) of the up-shifting operation device 91 (FIG. 4) and the operation lever 923 (FIG. 4) of the down-shifting operation device 92 (FIG. 4). In this case, the time required for the gear-shifting of the transmission 5 can be adjusted according to the driver's intention, thus improving the drivability of the motorcycle 100.

In addition, the driver can adjust the rate of decrease and the rate of increase of the absolute values of the engine torque and the clutch torque by adjusting the operation speed of the operation lever 913. Accordingly, the values of the engine torque and the clutch torque can be decreased and increased at the rates according to the driver's intention. In this case, the engine torque and the clutch torque can be decreased and increased at the rates according to the driver's intention in the gear-shifting, thus further improving the drivability of the motorcycle 100.

Moreover, the change with time of the engine torque, the change with time of the clutch torque and the time required for the gear-shifting can be adjusted according to the driver's intention, so that a driving feeling can be sufficiently improved even in the motorcycle 100 having a light vehicle weight (small inertia) and being liable to be affected by the speed change operation.

Second Preferred Embodiment (1) Outline of Transmission Control System

Figure 14:
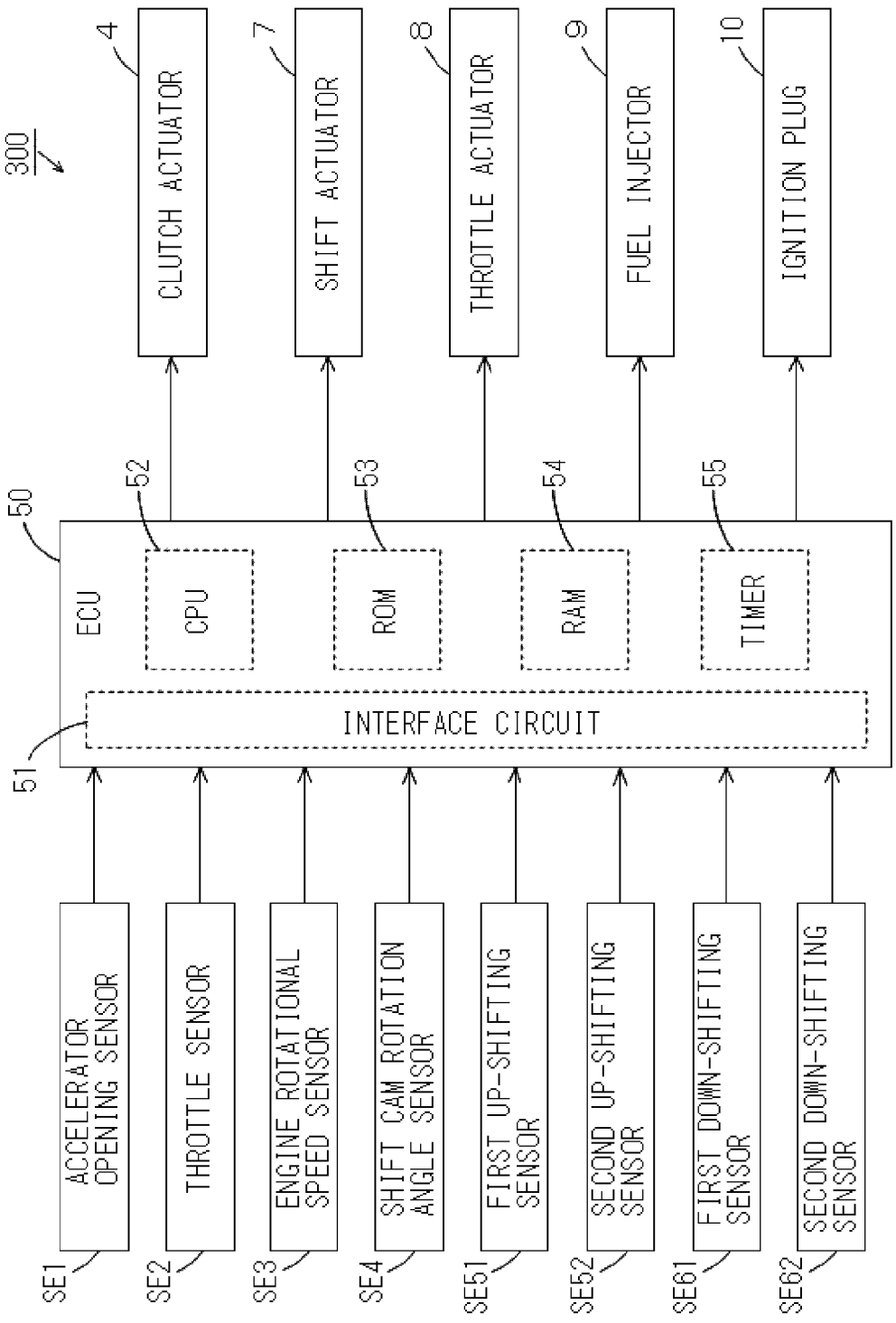
FIG. 14 is a block diagram showing the structure of a transmission control system according to a second preferred embodiment of the present invention.

FIG. 14 is a block diagram showing the structure of a transmission control system according to a second preferred embodiment.

The transmission control system 300 shown in FIG. 14 is different from the transmission control system 200 shown in FIG. 3 in the following points.

As shown in FIG. 14, the transmission control system 300 according to the present preferred embodiment includes a first up-shifting sensor SE51, a second up-shifting sensor SE52, a first down-shifting sensor SE61 and a second down-shifting sensor SE62. In addition, the ECU 50 is provided with a timer 55.

The first up-shifting sensor SE51 and the second up-shifting sensor SE52 are provided in an up-shifting operation device 93 (see FIG. 15), described later, and the first down-shifting sensor SE61 and the second down-shifting sensor SE62 are provided in a down-shifting operation device 94 (see FIG. 16), described later. The up-shifting operation device 93 and the down-shifting operation device 94 are provided at the handle 105 (FIG. 1), for example.

Figure 15:
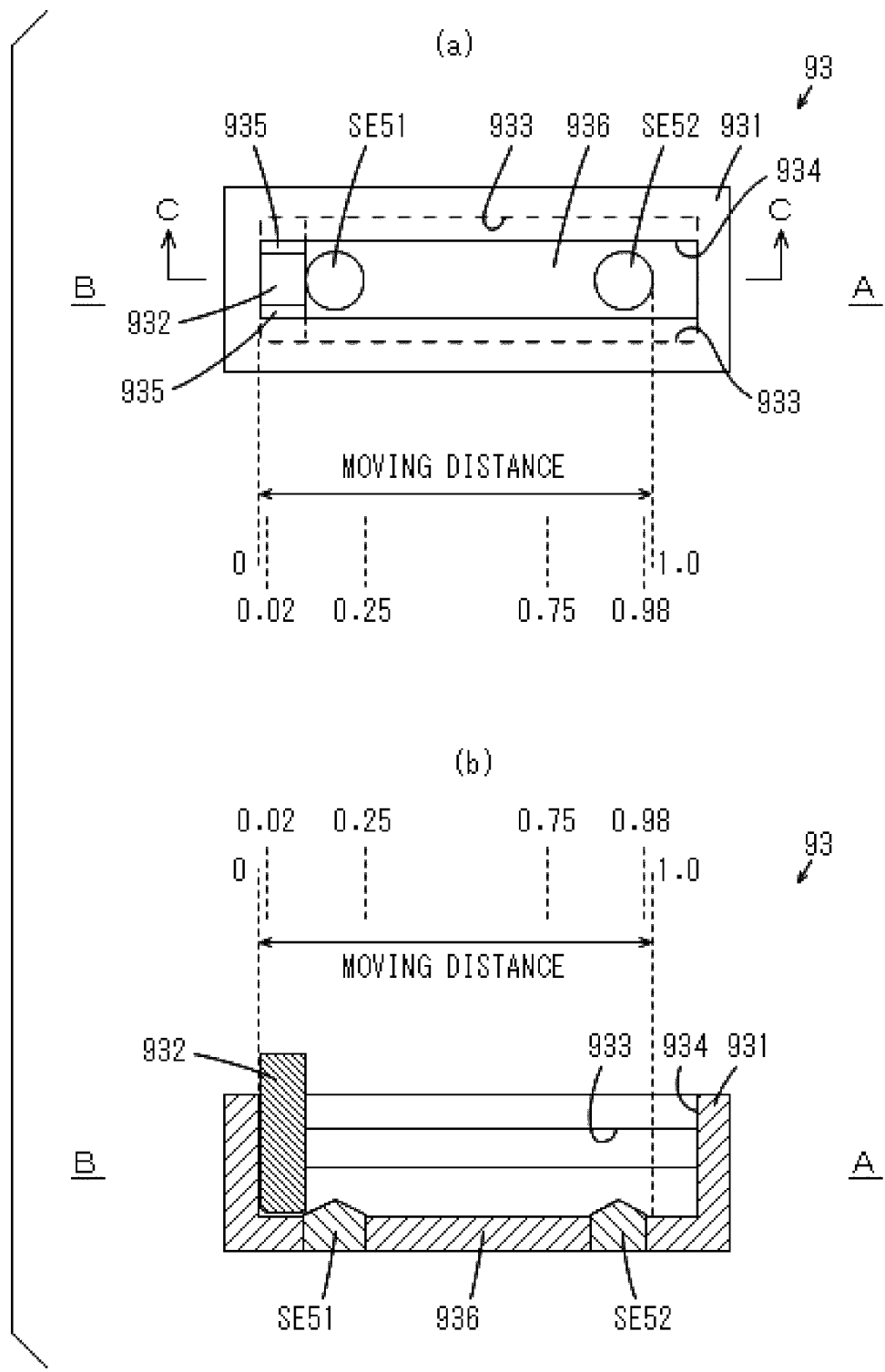
FIG. 15 is a schematic diagram showing an example of the up-shifting operation device.

FIG. 15 is a schematic diagram showing an example of the up-shifting operation device 93 according to the present preferred embodiment. Note that in FIG. 15, (a) is a top view of the up-shifting operation device 93, and (b) is a sectional view taken along the line C-C of (a). Note that a side indicated by a character A is referred to as the front, and a side indicated by a character B is referred to as the rear for simplifying the description in FIG. 15.

As shown in FIG. 15, the up-shifting operation device 93 includes a main body 931 and an operation lever 932. The main body 931 has an opening 934 and inner side surfaces, grooves 933 are formed at the both side surfaces inside the main body 931 to extend in a front-to-rear direction, and the opening 934 is formed at the center of an upper surface of the main body 931 to extend in the front-to-rear direction.

As shown in (a) of FIG. 15, projections 935 are formed at both side surfaces of the operation lever 932 to project in a direction perpendicular to the front-to-rear direction. The projections 935 are movably supported by the grooves 93 in the front-to-rear direction. As shown in (b) of FIG. 15, an upper end of the operation lever 932 projects upward from the opening 934 and a lower end of the operation lever 932 is slightly spaced apart from an inner bottom surface of the main body 931 in a state in which the projections 935 (see (a) of FIG. 15) are supported by the grooves 933.

Note that the operation lever 932 is biased to the rear side by a biasing member that is not shown. Therefore, the operation lever 932 is positioned at the rear end within the main body 931 when not being operated by the driver.

The first up-shifting sensor SE51 and the second up-shifting sensor SE52 are buried in a bottom portion 936 of the main body 931. In the present preferred embodiment, the first up-shifting sensor SE51 is arranged on the rear side within the main body 931, and the second up-shifting sensor SE52 is arranged on the front side within the main body 931. Upper portions of the first up-shifting sensor SE51 and the second up-shifting sensor SE52 are arranged to project upward from the bottom portion 936 and move up and down.

In the present preferred embodiment, the driver first moves the operation lever 932 to the front end within the main body 931 for performing the up-shifting of the transmission 5. Then, the driver releases or moves the operation lever 932 to the rear. In this case, the operation lever 932 passes above the first up-shifting sensor SE51 and the second up-shifting sensor SE52, causing the lower surface of the operation lever 932 to push down the first up-shifting sensor SE51 and the second up-shifting sensor SE52.

Hereinafter, a brief description of the relationship between the position of the operation lever 932 and the up-shifting sensors SE51, SE52 will be provided. Note that in the following description, the distance for which the operation lever 932 can move within the main body 931 is defined as 1.

In the up-shifting operation device 93 according to the present preferred embodiment, the first up-shifting sensor SE51 is pushed down by the lower surface of the operation lever 932 when the operation lever 932 is positioned in a region at a distance of about 0.02 to about 0.25, for example, from a reference position (the rear end within the main body 931) as shown in FIG. 15.

When the operation lever 932 is positioned in a region at a distance of about 0.75 to about 0.98, for example, from the reference position, the second up-shifting sensor SE52 is pushed down by the lower surface of the operation lever 932.

Here, the first up-shifting sensor SE51 and the second up-shifting sensor SE52 output signals of low level when not being pushed down by the operation lever 932, and output signals of high level when being pushed down by the operation lever 932 in the present preferred embodiment.

Therefore, the operation lever 932 is positioned in the region at the distance of about 0.02 to about 0.25, for example, from the reference position when the signal of high level is output from the first up-shifting sensor SE51. The operation lever 932 is positioned in the region at the distance of about 0.75 to about 0.98, for example, from the reference position when the signal of high level is output from the second up-shifting sensor SE52.

Figure 16:
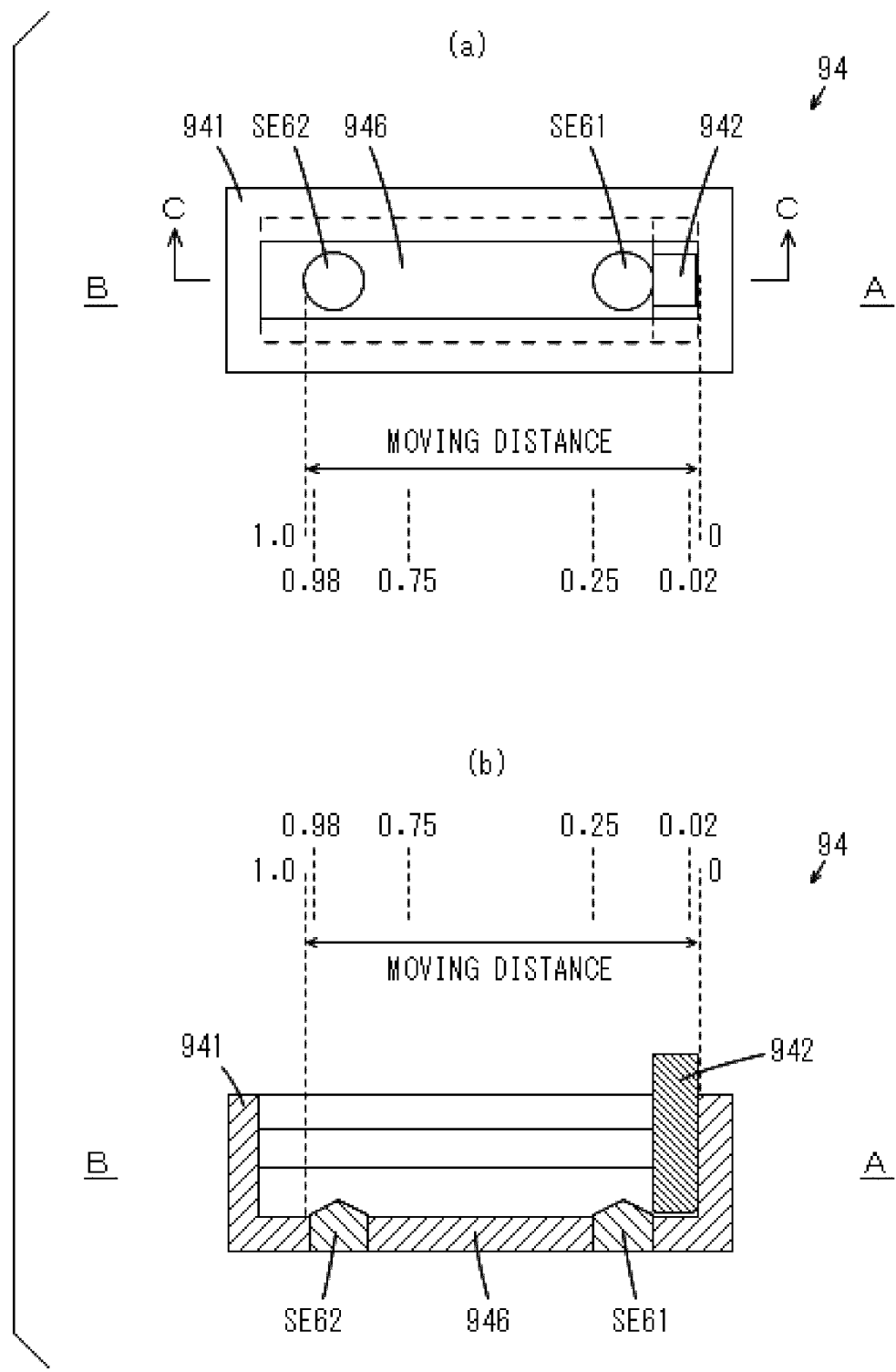
FIG. 16 is a schematic diagram showing an example of the down-shifting operation device.

Next, description of the down-shifting operation device 94 is provided. FIG. 16 is a schematic diagram showing an example of the down-shifting operation device 94. Note that (a) is a top view of the down-shifting operation device 94, and (b) is a sectional view taken along the line C-C of (a) in FIG. 16. Note that a side indicated by a character A is referred to as the front, and a side indicated by a character B is referred to as the rear for simplifying the description in FIG. 16.

As shown in FIG. 16, the down-shifting operation device 94 includes a main body 941 and an operation lever 942 having the same structures as the main body and the operation lever of the up-shifting operation device 93. Note that the operation lever 942 is biased to the front side by a biasing member that is not shown in the down-shifting operation device 94. Accordingly, the operation lever 942 is positioned at the front end within the main body 941 when not operated by the driver.

The first down-shifting sensor SE61 and the second down-shifting sensor SE62 are buried in a bottom portion 946 of the main body 941. In the present preferred embodiment, the first down-shifting sensor SE61 is arranged on the front side within the main body 941, and the second down-shifting sensor SE62 is arranged on the rear side within the main body 941. Upper portions of the first down-shifting sensor SE61 and the second down-shifting sensor SE62 are arranged to project upward from the bottom portion 946 and move up and down.

In the present preferred embodiment, the driver first moves the operation lever 942 to the rear end within the main body 941 for performing the down-shifting of the transmission 5. Then, the driver releases or moves the operation lever 942 to the front. In this case, the operation lever 942 passes above the first down-shifting sensor SE 61 and the second down-shifting sensor SE 62, causing the lower surface of the operation lever 942 to push down the first down-shifting sensor SE61 and the second down-shifting sensor SE62.

Hereinafter, a brief description of a relationship between the position of the operation lever 942 and the down-shifting sensors SE61, SE62 will be provided. Note that in the following description, the distance for which the operation lever 942 can move within the main body 941 is defined as 1.

In the down-shifting operation device 94 according to the present preferred embodiment, the first down-shifting sensor SE61 is pushed down by the lower surface of the operation lever 942 when the operation lever 942 is positioned in a region at a distance of about 0.02 to about 0.25, for example, from a reference position (the front end within the main body 941) as shown in FIG. 16.

When the operation lever 942 is positioned in a region at a distance of about 0.75 to about 0.98, for example, from the reference position, the second down-shifting sensor SE62 is pushed down by the lower surface of the operation lever 942.

Here, the first down-shifting sensor SE61 and the second down-shifting sensor SE62 output signals of low level when not being pushed down by the operation lever 942, and output signals of high level when being pushed down by the operation lever 942 in the present preferred embodiment.

Therefore, the operation lever 942 is positioned in the region at the distance of about 0.02 to about 0.25, for example, from the reference position when the signal of high level is output from the first down-shifting sensor SE61. The operation lever 942 is positioned in the region at the distance of about 0.75 to about 0.98, for example, from the reference position when the signal of high level is output from the second down-shifting sensor SE62.

The CPU 52 performs the up-shifting control and the down-shifting control based on the foregoing relationships in the present preferred embodiment. Detailed description thereof will be provided in the following paragraphs.

(2) The Up-Shifting Control

Figure 17:
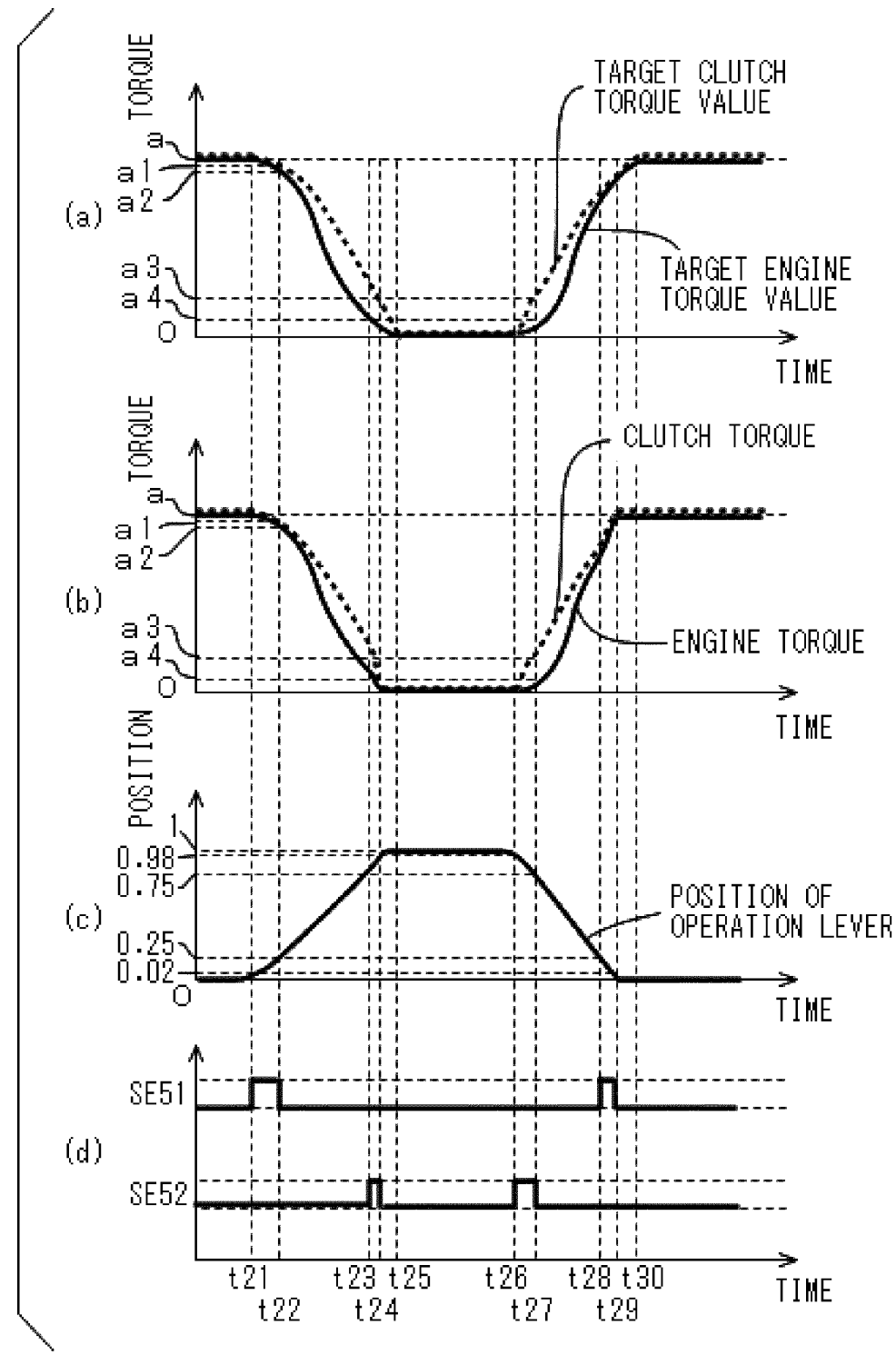
FIG. 17 is a diagram for explaining up-shifting control.

FIG. 17 is a diagram for explaining the up-shifting control according to the present preferred embodiment. In FIG. 17, (a) shows change with time of the target value of the engine torque and change with time of the target value of the clutch torque calculated by the CPU 52, (b) shows change with time of the engine torque generated in the engine 107 and change with time of the clutch torque generated in the clutch 3, (c) shows change with time of the position (the distance from the reference position) of the operation lever 932, and (d) shows change with time of the output signal of the first up-shifting sensor SE51 and change with time of the output signal of the second up-shifting sensor SE52.

Note that in (a) of FIG. 17, the solid line indicates the target value of the engine torque, and the dotted line indicates the target value of the clutch torque. In (b) of FIG. 17, the solid line indicates the engine torque, and the dotted line indicates the clutch torque. In (c) of FIG. 17, the position of the operation lever 932 when the distance of movement of the operation lever 932 from the reference position (the rear end within the main body 931 (FIG. 15) is maximized is defined as 1.0, and the reference position is defined as 0.

Hereinafter, a detailed description of the control operation of the CPU 52 in the up-shifting will be provided.

As shown in (c) of FIG. 17, the driver moves the operation lever 932 (FIG. 15) to the front to cause the operation lever 932 to move to the position of about 0.02 at a time point t21 in the present preferred embodiment. Thus, the output signal of the first up-shifting sensor SE51 attains a high level, and the decrease of the clutch torque and the engine torque is started as shown in (b) and (d) of FIG. 17.

The operation lever 932 moves to the position of about 0.98 at a time point 24 to cause the output signal of the second up-shifting sensor SE52 to attain a high level as shown in (c) and (d) of FIG. 17. This causes the clutch torque and the engine torque to decrease to zero as shown in (b) of FIG. 17.

Here, a map representing the relationship between an arbitrary position and the target value of the clutch torque and a map representing the relationship between an arbitrary position and the target value of the engine torque are previously stored in the ROM 53 (or the RAM 54), of the ECU 50, for example, in order to decrease the clutch torque and the engine torque corresponding to the position of the operation lever 932 in a period from a time point t21 to t24 in the present preferred embodiment.

Figure 18:
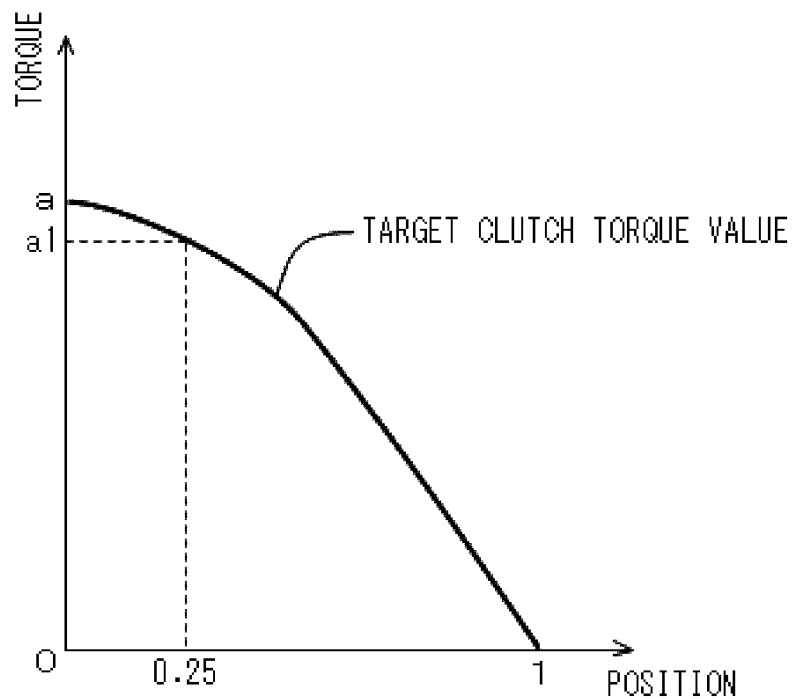
FIG. 18 is a diagram showing an example of the map stored in the ECU.
Figure 19:
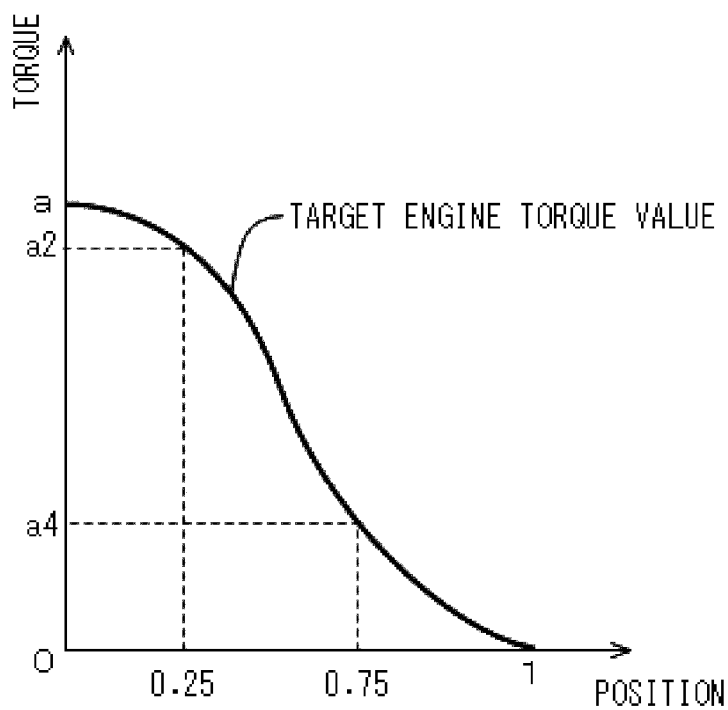
FIG. 19 is a diagram showing an example of the map stored in the ECU.

FIGS. 18 and 19 are diagrams showing examples of the maps used in the period from the time point t21 to t24. In the map shown in FIG. 18, the arbitrary position and the target value of the clutch torque are associated with each other. In the map shown in FIG. 19, the arbitrary position and the target value of the engine torque are associated with each other. Note that the value a is a variable, and the values of the clutch torque and the engine torque at the time point t21 (FIG. 17) attain the value a in the maps shown in FIGS. 18 and 19.

The CPU 52 calculates the change with time of the position of the operation lever 932 in the period from the time point t21 to t24 based on a preset condition and the output signal of the first up-shifting sensor SE51, and calculates the change with time of the target value of the clutch torque from the map shown in FIG. 18 based on the calculated change with time of the position in the present preferred embodiment.

Then, the CPU 52 controls the clutch actuator 4 such that the change with time of the clutch torque generated in the clutch 3 is equal to the change with time of the calculated target value in the period from the time point t21 to t24.

Similarly, the CPU 52 calculates the change with time of the target value of the engine torque from the map shown in FIG. 19 based on the change with time of the position of the operation lever 932 in the period from the time point t21 to t24. Then, the CPU 52 controls each component (the throttle actuator 8, the fuel injectors 9 and the ignition plugs 10, for example) such that the change with time of the engine torque generated in the engine 107 is equal to the change with time of the calculated target value in the period from the time point t21 to t24.

Specifically, the CPU 52 assumes that the operation lever 932 moves at a constant speed in a predetermined time from the time point t21 (hereinafter referred to as a torque decrease starting time), for example, and moves from the position 0 to the position of about 0.25 in the torque decrease starting time. The CPU 52 estimates the change with time of the position of the operation lever 932 in the torque decrease staring time based on the assumption.

Moreover, the CPU 52 calculates the change with time of the target value of the clutch torque in the torque decrease starting time from the map shown in FIG. 18 based on the estimated change with time of the position of the operation lever 932. Then, the CPU 52 controls the clutch actuator 4 such that the change with time of the clutch torque generated in the clutch 3 is equal to the calculated change with time of the target value in the torque decrease starting time. Note that FIG. 18 shows the target value of the clutch torque at an end time point of the torque decrease starting time as a value a1.

Similarly, the CPU 52 calculates the change with time of the target value of the engine torque in the torque decrease starting time from the map shown in FIG. 19 based on the change with time of the position of the operation lever 932 that is estimated in the above-described manner, and controls each component according to the target value. Note that FIG. 19 shows the target value of the engine torque at the end time point of the torque decrease starting time as a value a2.

When the output signal of the first up-shifting sensor SE51 attains a low level at a time point t22, the CPU 52 calculates an actual movement speed of the operation lever 932 in a period from the time point t21 to t22 based on the length of the period from the time point t21 to t22 and the distance of movement of the operation lever 932. Note that the length of the period from the time point t21 to t22 is measured by the timer 55 (FIG. 14). The operation lever 932 moves from the position of about 0.02 to the position of about 0.25 in the period in which the output signal of the first up-shifting sensor SE51 attains a high level as shown in (c) and (d) of FIG. 17. Thus, the distance of movement of the operation lever 932 in the period from the time point t21 to t22 is about 0.23.

Next, the CPU 52 assumes that the operation lever 932 moves to the position of about 1.0 (the front end within the main body 931 (FIG. 15)) at the movement speed that is calculated in the foregoing manner, and estimates the change with time of the position of the operation lever 932 from the position of about 0.25 to the position of about 1.0 based on the assumed movement speed.

Then, the CPU 52 calculates the change with time of the target value of the clutch torque after the time point t22 from the map shown in FIG. 18 based on the estimated change with time of the position of the operation lever 932. The CPU 52 subsequently controls the clutch actuator 4 such that the change with time of the clutch torque generated in the clutch 3 after the time point t22 is equal to the calculated change with time of the target value.

Similarly, the CPU 52 calculates the change with time of the target value of the engine torque after the time point t22 from the map shown in FIG. 19 based on the change with time of the position of the operation lever 932 that is estimated in the foregoing manner, and controls each component according to the target value.

Portion (a) of FIG. 17 shows examples of the change with time of the target values of the clutch torque and the engine torque calculated in the above-described manner. In the example shown in (a) of FIG. 17, the target values of the clutch torque and the engine torque decrease from the value a1 and the value a2 at the time point t21 and attains zero at a time point t25. That is, according to the change with time of the position of the operation lever 932 estimated by the CPU 52, the operation lever 932 reaches the position of about 1.0 at the time point t25. Hereinafter, the time point t25 that is estimated by the CPU 52 is referred to as a first-order estimated reach time point t25.

Note that when the torque decrease starting time ends before the time point t22, the CPU 52 maintains the target value of the clutch torque at the value a1 and maintains the target value of the engine torque at the value a2 until the time point t22 in the present preferred embodiment. When the time point t22 is before the end of the torque decrease starting time, the CPU 52 finishes the torque decrease starting time at the time point t22. Moreover, the CPU 52 sets the target value of the clutch torque at the time point t22 to the value a1 and sets the target value of the engine torque at the time point t22 to the value a2.

Next, when the output signal of the second up-shifting sensor SE52 attains a high level at a time point t23, the CPU 52 calculates the actual movement speed of the operation lever 932 in the period from the time point t22 to t23 based on the length of the period from the time point t22 to t23 and the distance of movement of the operation lever 932. Note that the length of the period from the time point t22 to t23 is measured by the timer 55 (FIG. 14). As shown in (c) and (d) of FIG. 17, the operation lever 932 moves from the position of about 0.25 to the position of about 0.75 in the period from the time when the output signal of the first up-shifting sensor SE51 attains a low level to the time when the output signal of the second up-shifting sensor SE52 attains a high level. Thus, the distance of movement of the operation lever 932 is about 0.50 in the period from the time point t22 to t23.

Next, the CPU 52 estimates the time point when the operation lever 932 reaches the position of about 1.0 (hereinafter referred to as a second-order estimated reach time point) based on the movement speed of the operation lever 932 calculated in the above-described manner. The CPU 52 then corrects the target values of the clutch torque and the engine torque such that the clutch torque and the engine torque attain zero at the second-order estimated reach time point.

Specifically, the target values of the clutch torque and the engine torque are corrected so as to decrease to zero in proportion to an elapse of time in a period from the time point t23 to the second-order estimated reach time point, for example. Then, the CPU 52 controls the clutch actuator 4 according to the corrected target value of the clutch torque and controls each component according to the corrected target value of the engine torque.

FIG. 17 shows an example of the case in which the second-order estimated reach time point is set before the first-order estimated reach time point t25. In this case, the clutch torque and the engine torque decrease more quickly after the time point t23 than the target values of the clutch torque and the engine torque shown in (a) of FIG. 17, and attain zero before the first-order estimated reach time point t25 as shown in (b) of FIG. 17. Note that when the second-order estimated reach time point is set after the first-order estimated reach time point t25, the clutch torque and the engine torque decrease more gradually after the time point t23 than the target value of the clutch torque shown in (a) of FIG. 17.

The CPU 52 then determines whether the clutch 3 is completely disconnected when the output signal of the second up-shifting sensor SE52 attains a low level at the time point t24. Then, when the clutch 3 is not completely disconnected, the CPU 52 controls the clutch actuator 4 to completely disconnect the clutch 3 at the time point t24. Note that the CPU 52 can determine whether the clutch 3 is disconnected based on a control amount of the clutch actuator 4 or a movement amount of the push rod 5e (FIG. 2), for example.

The foregoing control causes the clutch torque to attain zero at the time point t24 even when the second-order estimated reach time point is set after the first-order estimated reach time point t25, for example. This prevents the disconnection operation of the clutch 3 from lagging behind the operation of the operation lever 923 by the driver.

Note that when the clutch 3 is not completely disconnected at the time point t24, the clutch 3 may be completely disconnected and the engine torque is decreased to zero at the time point t24.

Next, description of a return operation of the clutch torque and the engine torque will be provided.

As shown in (c) of FIG. 17, the driver moves the operation lever 932 (FIG. 15) from the front end to the rear in the main body 931 (FIG. 15) to cause the operation lever 932 to move (return) to the position of about 0.98 at a time point t26. Thus, the output signal of the second up-shifting sensor SE52 attains a high level, and the increase of the clutch torque and the engine torque is started as shown in (b) and (d) of FIG. 17.

As shown in (c) and (d) of FIG. 17, the operation lever 932 moves to the position of about 0.02 at a time point t29 to cause the output signal of the first up-shifting sensor SE51 to attain a high level. Accordingly, the clutch torque and the engine torque return to the value a as shown in (b) of FIG. 17.

Here, a map representing the relationship between the arbitrary position and the target value of the clutch torque is previously stored in the ROM 53 (or the RAM 54) of the ECU 50, for example, in order to increase the clutch torque corresponding to the position of the operation lever 932 in a period from the time point t26 to t29 in the present preferred embodiment.

Figure 20:
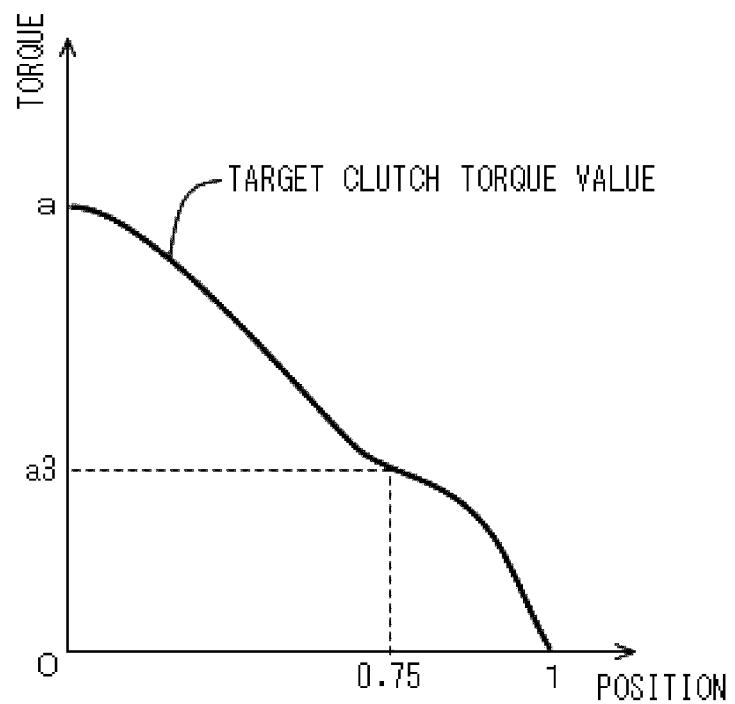
FIG. 20 is a diagram showing an example of the map stored in the ECU.

FIG. 20 is a diagram showing an example of the map used in the period from the time point t26 to t29. In the map shown in FIG. 20, the arbitrary position and the target value of the clutch torque are associated with each other. Note that the value a is a variable in the map of FIG. 20, and the value of the clutch torque at the time point t21 (FIG. 17) attains the value a.

In the return of the clutch torque, the CPU 52 assumes that the operation lever 932 moves at a constant speed in a predetermined time from the time point t26 (hereinafter referred to as a torque return starting time) and moves from the position of about 1.0 to the position of about 0.75 in the torque return starting time, for example. In addition, the CPU 52 estimates the change with time of the position of the operation lever 932 in the torque return starting time based on the assumption.

Moreover, the CPU 52 calculates the change with time of the target value of the clutch torque in the torque return starting time from the map shown in FIG. 20 based on the estimated change with time of the position of the operation lever 932. Then, the CPU 52 controls the clutch actuator 4 such that the change with time of the clutch torque generated in the clutch 3 is equal to the calculated change with time of the target value in the torque return starting time. Note that FIG. 20 shows the target value of the clutch torque at an end time point of the torque return starting time as a value a3.

Similarly, the CPU 52 calculates the change with time of the target value of the engine torque in the torque return starting time from the map shown in FIG. 19 based on the change with time of the position of the operation lever 932 estimated in the foregoing manner, and controls each component according to the target value. Note that FIG. 19 shows the target value of the engine torque at the end time point of the torque return starting time as a value a4.

When the output signal of the second up-shifting sensor SE52 attains a low level at a time point t27, the CPU 52 calculates the actual movement speed of the operation lever 932 in the period from the time point t26 to t27 based on the length of the period from the time point t26 to t27 and the distance of movement of the operation lever 932. Note that the length of the period from the time point t26 to t27 is measured by the timer 55 (FIG. 14). As shown in (c) and (d) of FIG. 17, the operation lever 932 moves from the position of about 0.98 to the position of about 0.75 in the period in which the output signal of the second up-shifting sensor SE52 attains a high level. Accordingly, the distance of movement of the operation lever 93 in the period from the time point t26 to t27 is about 0.23.

Then, the CPU 52 assumes that the operation lever 932 moves to the reference position (the position 0: see FIG. 15) at the movement speed calculated in the foregoing manner, and estimates the change with time of the position of the operation lever 932 from the position of about 0.75 to the reference position based on the assumed movement speed.

Next, the CPU 52 calculates the change with time of the target value of the clutch torque after the time point t27 from the map shown in FIG. 20 based on the estimated change with time of the position of the operation lever 932. Then, the CPU 52 controls the clutch actuator 4 such that the change with time of the clutch torque generated in the clutch 3 after the time point t27 is equal to the calculated change with time of the target value.

Similarly, the CPU 52 calculates the change with time of the target value of the engine torque after the time point t27 from the map shown in FIG. 19 based on the change with time of the position of the operation lever 932 that is estimated in the foregoing manner, and controls each component according to the target value.

Portion (a) of FIG. 17 shows examples of the change with time of the target values of the clutch torque and the engine torque calculated in the foregoing manner. In the examples shown (a) of FIG. 17, the target values of the clutch torque and the engine torque increase from the value a3 and the value a4 at the time point t27 to attain the value a at a time point t30. That is, according to the change with time of the position of the operation lever 932 that is estimated by the CPU 52, the operation lever 932 returns to the reference position at the time point 30. Hereinafter, the time point t30 estimated by the CPU 52 is referred to as a first-order estimated return time point t30.

Note that when the torque return starting time ends before the time point t27, the CPU 52 maintains the target value of the clutch torque at the value a3 and maintains the target value of the engine torque at the value a4 until the time point t27 in the present preferred embodiment. In addition, when the time point t27 is before the end of the torque return starting time, the CPU 52 ends the torque return starting time at the time point t27. The CPU 52 sets at the time point t27 the target value of the clutch torque to the value a3 and sets the target value of the engine torque to the value a4.

Next, when the output signal of the first up-shifting sensor SE51 attains a high level at a time point t28, the CPU 52 calculates the actual movement speed of the operation lever 932 in a period from the time point t27 to t28 based on the length of the period from the time point t27 to t28 and the distance of movement of the operation lever 932. Note that the length of the period from the time point t27 to t28 is measured by the timer 55 (FIG. 14). The operation lever 932 moves from the position of about 0.75 to the position of about 0.25 in the period from the time when the output signal of the second up-shifting sensor SE52 attains a low level to the time when the output signal of the first up-shifting sensor SE51 attains a high level as shown in (c) and (d) of FIG. 17. Thus, the distance of movement of the operation lever 932 in the period from the time point t27 to t28 is about 0.50.

Then, the CPU 52 estimates a time point when the operation lever 932 returns to the reference position (hereinafter referred to as a second-order estimated return time point) based on the movement speed of the operation lever 932 calculated in the foregoing manner. The CPU 52 subsequently corrects the target values of the clutch torque and the engine torque such that the clutch torque and the engine torque return to the value a at the second-order estimated return time point.

Specifically, the target values of the clutch torque and the engine torque are corrected so as to increase to the value a in proportion to an elapse of time in a period from the time point t28 to the second-order estimated return time point, for example. Then the CPU 52 controls the clutch actuator 4 corresponding to the corrected target value of the clutch torque and controls each component according to the corrected target value of the engine torque.

FIG. 17 shows an example when the second-order estimated return time point is set before the first-order estimated return time point t30. In this case, the clutch torque and the engine torque increase more quickly after the time point t28 than the target values of the clutch torque and the engine torque shown in (a) of FIG. 17 and return to the value a before the first-order estimated return time point t30 as shown in (b) of FIG. 17. Note that when the second-order estimated return time point is set after the first-order estimated return time point t30, the clutch torque and the engine torque increase more gradually than the target value of the clutch torque shown in (a) of FIG. 17 after the time point t28.

Next, when the output signal of the first up-shifting sensor SE51 attains a low level at the time point t29, the CPU 52 determines whether the clutch 3 is completely connected. Then, when the clutch 3 is not completely connected, the CPU 52 controls the clutch actuator 4 to completely connect the clutch 3 at the time point t29. Note that the CPU 52 can determine whether the clutch 3 is connected based on a control amount of the clutch actuator 4, for example.

The clutch torque returns to the value a at the time point t29 under the foregoing control even when the second-order estimated return time point is set after the first-order estimated return time point t30, for example. This prevents connection operation of the clutch 3 from lagging behind the operation of the operation lever 932 by the driver.

Note that when the clutch 3 is not completely connected at the time point t29, the clutch 3 may be completely connected and the engine torque may return to the value a at the time point t29.

As described above, the movement speed of the operation lever 932 can be calculated based on the output signal of the first up-shifting sensor SE51 or the second up-shifting sensor SE52 in the present preferred embodiment. In this case, the movement speed of the operation lever 932 can be calculated with an inexpensive structure, thus allowing for production of the transmission control system 300 at low cost.

In the present preferred embodiment, the time when the operation lever 932 reaches the front end within the main body 931 or the time when the operation lever 932 returns to the reference position can be calculated based on the output signal of the first up-shifting sensor SE51 or the second up-shifting sensor SE52. This prevents the disconnection operation and the connection operation of the clutch 3 from lagging behind the operation of the operation lever 932 by the driver. This results in improved drivability of the motorcycle 100.

Moreover, the driver can adjust the lengths of the disconnection operation period of the clutch 3, the period for switching the gear position and the connection operation period of the clutch 3 by adjusting the operation speed of the operation lever 932. In this case, the time required for the up-shifting of the transmission 5 can be adjusted according to the driver's intention, thus sufficiently improving the drivability of the motorcycle 100.

The driver can adjust the rates of decrease and the rates of increase of the engine torque and the clutch torque by adjusting the operation speed of the operation lever 932. Thus, the values of the engine torque and the clutch torque can be decreased and increased at the rates according to the driver's intention. In this case, the engine torque and the clutch torque can be decreased and increased at the rates according to the driver's intention in the up-shifting. This further improves the drivability of the motorcycle 100.

(3) Down-Shifting Control

Next, description of the down-shifting control is provided.

Figure 21:
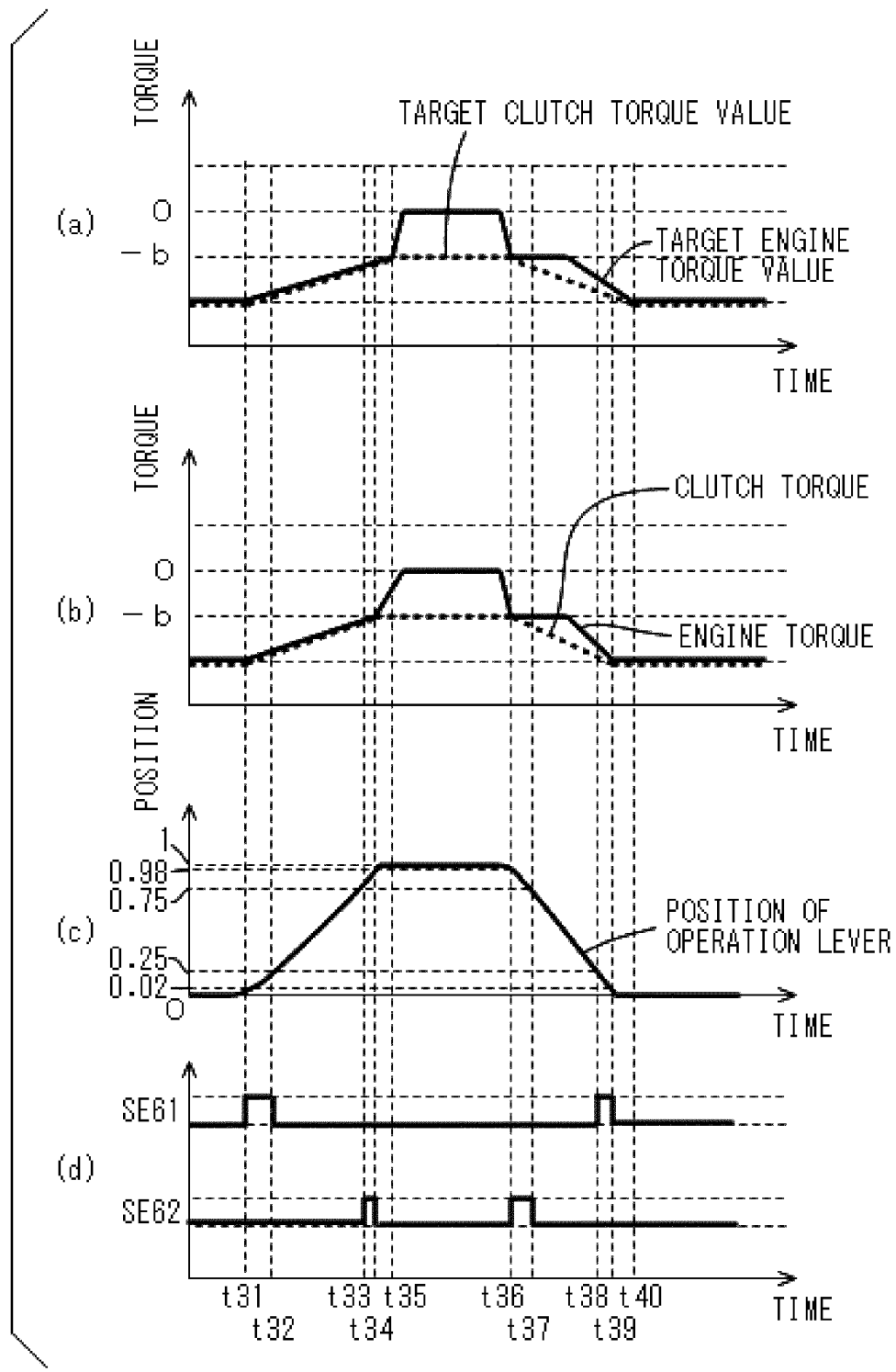
FIG. 21 is a diagram for explaining down-shifting control.

FIG. 21 is a diagram for explaining the down-shifting control according to the present preferred embodiment. In FIG. 21, (a) shows change with time of the target value of the engine torque and change with time of the target value of the clutch torque calculated by the CPU 52, (b) shows change with time of the engine torque generated in the engine 107 and change with time of the clutch torque generated in the clutch 3, (c) shows change with time of the position of the operation lever 932 (the distance from the reference position), and (d) shows change with time of the output signal of the first down-shifting sensor SE61 and change with time of the output signal of the second down-shifting sensor SE62.

Note that time points t31 to t40 of FIG. 21 correspond to the time points t21 to t30 of FIG. 17, respectively.

The change with time of the target value of the clutch torque and the change with time of the target value of the engine torque can be calculated from the same map as that used in the first preferred embodiment, for example.

As shown in FIG. 21, in the down-shifting control according to the present preferred embodiment, the CPU 52 controls the clutch torque and the engine torque based on the output signals of the first down-shifting sensor SE61 and the second down-shifting sensor SE62 in the same manner as in the up-shifting control of FIG. 17.

Accordingly, the movement speed of the operation lever 942 can be calculated based on the output signal of the first down-shifting sensor SE61 or the second down-shifting sensor SE62. In this case, the movement speed of the operation lever 942 can be calculated with an inexpensive structure, thus allowing for production of the transmission control system 300 at low cost.

In addition, the time when the operation lever 942 (FIG. 16) reaches the rear end within the main body 941 (FIG. 16) or the time when the operation lever 942 returns to the reference position can be calculated based on the output signal of the first down-shifting sensor SE61 or the second down-shifting sensor SE62. This prevents the disconnection operation and the connection operation of the clutch 3 from lagging behind the operation of the operation lever 942 by the driver. This results in improved drivability of the motorcycle 100.

Moreover, the driver can adjust the lengths of the disconnection operation period of the clutch 3, the period for switching the gear position and the connection operation period of the clutch 3 by adjusting the operation speed of the operation lever 942. In this case, the time required for the down-shifting of the transmission 5 can be adjusted according to the driver's intention, thus sufficiently improving the drivability of the motorcycle 100.

Moreover, the driver can adjust the rates of decrease and the rates of increase of the absolute values of the engine torque and the clutch torque by adjusting the operation speed of the operation lever 942. Thus, the values of the engine torque and the clutch torque can be decreased and increased at the rates according to the driver's intention. In this case, the engine torque and the clutch torque can be decreased and increased at the rates according to the driver's intention in the down-shifting, thus further improving the drivability of the motorcycle 100.

(4) Effects and Advantages of the Present Preferred Embodiment

As described above, the operation speeds of the operation levers 932, 942 by the driver can be calculated based on the output signals of the sensors SE51, SE52, SE61, SE62 in the present preferred embodiment. Thus, the up-shifting operation device 93 and the down-shifting operation device 94 can be produced with inexpensive structures.

Moreover, the time at which the movement of the operation levers 932, 942 is completed in the main bodies 931, 941 can be calculated based on the output signals of the sensors SE51, SE52, SE61, SE62 in the present preferred embodiment. This prevents the disconnection operation and the connection operation of the clutch 3 from lagging behind the operations of the operation levers 932, 942 by the driver. This results in improved drivability of the motorcycle 100.

The driver can adjust the lengths of the disconnection operation period of the clutch 3, the period for switching the gear position and the connection operation period of the clutch 3 by adjusting the operation speed of the operation levers 932, 942. In this case, the time required for the gear-shifting of the transmission 5 can be adjusted according to the driver's intention, thus sufficiently improving the drivability of the motorcycle 100.

The driver can adjust the rates of decrease and the rates of increase of the absolute values of the engine torque and the clutch torque by adjusting the operation speed of the operation levers 932, 942. Thus, the values of the engine torque and the clutch torque can be decreased and increased at the rates according to the driver's intention. In this case, the engine torque and the clutch torque can be decreased or increased at the rates according to the driver's intention in the gear-shifting. This further improves the drivability of the motorcycle 100.

Moreover, the change with time of the engine torque, the change with time of the clutch torque and the time required for the gear-shifting can be adjusted according to the driver's intention, so that a driving feeling can be sufficiently improved even in the motorcycle 100 having a light vehicle weight (small inertia) and that is affected by the speed change operation.

Other Preferred Embodiments (1) Other Examples of the Motorcycle

While the up-shifting sensor SE5 and the down-shifting sensor SE6 are preferably provided in the up-shifting operation device 91 and the down-shifting operation device 92 in the foregoing preferred embodiment, the up-shifting sensor SE5 and the down-shifting sensor SE6 may be provided at the shift pedal 112 (FIG. 1). In this case, the up-shifting sensor SE5 and the down-shifting sensor SE6 are provided such that the same signal as that in the foregoing preferred embodiments is output based on an operation of the shift pedal 112 by the driver, thus allowing the driver to perform the gear-shifting of the transmission 5 by operating the shift pedal 112.

Similarly, the up-shifting sensors SE51, SE52 and the down-shifting sensors SE61, SE62 may be provided at the shift pedal 112.

While the motorcycle 100 is described as an example of the vehicle in the foregoing preferred embodiments, another vehicle such as a three-wheeled motor vehicle and a four-wheeled motor vehicle may be used.

(2) Other Examples of the Transmission Control System

While the semi-automatic transmission control systems 200, 300 that automatically perform the gear-shifting of the transmission 5 based on the shifting operation by the driver are preferably used in the foregoing preferred embodiments, the control mode of the transmission control systems 200, 300 is not limited to the example described above. For example, the transmission control systems 200, 300 may further have a full-automatic control mode. In this case, the motorcycle 100 is provided with a switch for switching the full-automatic control mode and the semi-automatic control mode, for example, thereby allowing the driver to easily select the control mode. This further improves the drivability of the motorcycle 100.

While the driver can adjust the length of the period for switching the gear position of the transmission 5 by adjusting the operation speed of the operation levers 913, 923, 932, 942 (hereinafter abbreviated as the operation lever) in the foregoing preferred embodiments, a minimum time of the length of the period for switching the gear position may be preset. Even though the driver moves the operation lever within the minimum time, the CPU 52 may not perform the return operation of the clutch torque and the engine torque.

Note that the minimum time is preferably set based on the speed of the switching operation of the gear position of the transmission 5 and so on. In this case, the torque return operation can be prevented from being performed before the gear position of the transmission 5 is switched, thus sufficiently preventing an occurrence of a shock in the motorcycle 100 in the gear-shifting of the transmission 5.

When the driver moves the operation lever before the minimum time elapses, the torque return operation (the clutch connection operation) is started at a time point after the starting time point of movement of the operation lever, but is finished at the time point when the operation lever returns to the reference position. In this case, the gear-shifting (the connection operation of the clutch 3) of the transmission 5 can be completed in a period corresponding to the operation speed of the operation lever by the driver. This improves the drivability of the motorcycle 100.

Correspondences Between Claim Elements and Elements of Preferred Embodiments

In the following paragraph, non-limiting examples of correspondences between various claim elements and elements described above with respect to various preferred embodiments of the present invention are explained.

In the foregoing preferred embodiments, the operation levers 913, 923, 932, 942 or the shift pedal 112 are examples of a shifting operation member, the clutch actuator 4 is an example of a clutch actuation mechanism, the shift mechanism 6 and the shift actuator 7 are examples of a shift mechanism, the CPU 52 is an example of a controller, the throttle actuator 8, the fuel injector 9 or the ignition plug 10 is an example of an engine torque adjuster, the up-shifting sensor SE5 or the down-shifting sensor SE6 are examples of a first detector, the first up-shifting sensor SE51, the second up-shifting sensor SE52, the first down-shifting sensor SE61 or the second down-shifting sensor SE62 are examples of a second detector, the timer 55 is an example of a measurement device, and the rear wheel 116 is an example of a drive wheel.

As each of various elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A transmission control system of a vehicle including an engine, a clutch, and a transmission, the transmission control system comprising:
   a shifting operation member arranged to be operated by a driver to shift a gear position of the transmission, the shifting operation member being arranged to move between a first position and a second position;
   a detector arranged to detect the first position and the second position of the shifting operation member;
   a clutch actuation mechanism arranged to disconnect and connect the clutch;
   a shift mechanism arranged to shift the gear position of the transmission; and
   a controller arranged to control the clutch actuation mechanism and the shift mechanism; wherein
   the controller is arranged to determine a movement time or an operation speed of the shifting operation member according to an amount of time elapsed for the shifting operation member to move between the first position and the second position; and
   the controller is arranged to start a disconnection operation of the clutch by the clutch actuation mechanism at a first time point when the shifting operation member starts to move from the first position toward the second position, complete the disconnection operation of the clutch by the clutch actuation mechanism at a second time point when the shifting operation member reaches the second position, and shift the gear position by the shift mechanism after the second time point, such that adjustment of the movement time or the operation speed of the shifting operation member adjusts a period of time from the start of the disconnection operation of the clutch to the completion of the disconnection operation of the clutch.

2. The transmission control system according to claim 1, wherein the controller is arranged to control the disconnection operation of the clutch by the clutch actuation mechanism such that an absolute value of a transmission torque of the clutch decreases with an increasing distance of the shifting operation member from the first position.

3. The transmission control system according to claim 1, wherein the controller is arranged to control the disconnection operation of the clutch by the clutch actuation mechanism such that an absolute value of a transmission torque of the clutch decreases according to a first target transmission torque value that is set as a value that changes corresponding to an arbitrary position between the first position and the second position.

4. The transmission control system according to claim 1, wherein the controller is arranged to start a connection operation of the clutch by the clutch actuation mechanism at a third time point when the shifting operation member starts to move from the second position toward the first position, and complete the connection operation of the clutch by the clutch actuation mechanism at a fourth time point when the shifting operation member returns to the first position.

5. The transmission control system according to claim 4, wherein the controller is arranged to control the connection operation of the clutch by the clutch actuation mechanism such that an absolute value of a transmission torque of the clutch increases with an increasing distance of the shifting operation member from the second position.

6. The transmission control system according to claim 4, wherein the controller is arranged to control the connection operation of the clutch by the clutch actuation mechanism such that an absolute value of a transmission torque of the clutch increases according to a second target transmission torque value that is set as a value that changes corresponding to an arbitrary position between the second position and the first position.

7. The transmission control system according to claim 4, further comprising:
   an engine torque adjuster arranged to adjust an engine torque generated in the engine; wherein
   the controller is arranged to change the engine torque from a first value to a second value by the engine torque adjuster according to a first target engine torque value that changes corresponding to an arbitrary position between the first position and the second position in a period between the first time point and the second time point, and the controller is arranged to change the engine torque from the second value to the first value by the engine torque adjuster according to a second target engine torque value that changes corresponding to an arbitrary position between the second position and the first position in a period between the third time point and the fourth time point.

8. The transmission control system according to claim 1, further comprising:
   a detector arranged to detect third and fourth positions of the shifting operation member between the first position and the second position; and
   a measurement device arranged to measure a third time point when the third position is detected by the detector and a fourth time point when the fourth position is detected by the detector, wherein
   the controller is arranged to calculate a position of the shifting operation member based on the third and fourth positions detected by the detector and the third and fourth time points detected by the measurement device, and control the clutch actuation mechanism based on the calculated position.

9. A vehicle comprising:
a drive wheel;
an engine;
a transmission arranged to transmit a torque generated by the engine to the drive wheel;
a clutch provided between the engine and the transmission; and
a transmission control system including:
- a shifting operation member that is operated by a driver to shift a gear position of the transmission, the shifting operation member being arranged to move between a first position and a second position;
- a detector arranged to detect the first position and the second position of the shifting operation member;
- a clutch actuation mechanism arranged to disconnect and connect the clutch;
- a shift mechanism arranged to shift the gear position of the transmission; and
- a controller arranged to control the clutch actuation mechanism and the shift mechanism; wherein the controller is arranged to determine a movement time or an operation speed of the shifting operation member according to an amount of time elapsed for the shifting operation member to move between the first position and the second position; and the controller is arranged to start a disconnection operation of the clutch by the clutch actuation mechanism at a first time point when the shifting operation member starts to move from the first position toward the second position, complete the disconnection operation of the clutch by the clutch actuation mechanism at a second time point when the shifting operation member reaches the second position, and shift the gear position by the shift mechanism after the second time point, such that adjustment of the movement time or the operation speed of the shifting operation member adjusts a period of time from the start of the disconnection operation of the clutch to the completion of the disconnection operation of the clutch.

* * * * *

UNITED STATES PATENT AND TRADEMARK OFFICE
CERTIFICATE OF CORRECTION

| | |
|---|---|
| PATENT NO. | : 8,433,489 B2 |
| APPLICATION NO. | : 12/566177 |
| DATED | : April 30, 2013 |
| INVENTOR(S) | : Katsuhiro Arai |

It is certified that error appears in the above-identified patent and that said Letters Patent is hereby corrected as shown below:

On the title page item (73), should read as follows:

(73) Assignee: Yamaha Hatsudoki Kabushiki Kaisha, Shizuoka (JP)

Signed and Sealed this
Eighteenth Day of June, 2013

Teresa Stanek Rea
*Acting Director of the United States Patent and Trademark Office*